(12) United States Patent
Farley et al.

(10) Patent No.: US 12,499,007 B1
(45) Date of Patent: Dec. 16, 2025

(54) WORKLOAD RESOURCE DEVICE SLA FAILURE REMEDIATION SYSTEM

(71) Applicant: Dell Products L.P., Round Rock, TX (US)

(72) Inventors: Douglas Lang Farley, Round Rock, TX (US); Ethan A. Kaley, North Kingstown, RI (US); Joshua Gill, Apex, NC (US); Geoffrey A. Reid, Littleton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/743,732

(22) Filed: Jun. 14, 2024

(51) Int. Cl.
G06F 11/07 (2006.01)

(52) U.S. Cl.
CPC ...... *G06F 11/0793* (2013.01); *G06F 11/0709* (2013.01)

(58) Field of Classification Search
CPC . G06F 11/0709; G06F 11/079; G06F 11/0793
See application file for complete search history.

(56) References Cited

U.S. PATENT DOCUMENTS

| | | | |
|---|---|---|---|
| 7,685,465 B1 * | 3/2010 | Shaw | G06F 11/2028 714/4.11 |
| 8,078,913 B2 * | 12/2011 | Goldszmidt | H04L 41/0681 702/186 |
| 11,394,769 B2 | 7/2022 | Park et al. | |
| 11,567,806 B2 | 1/2023 | Glass et al. | |

OTHER PUBLICATIONS

Giannakopoulos, Ioannis, Ioannis Konstantinou, Dimitrios Tsoumakos, and Nectarios Koziris. "Cloud application deployment with transient failure recovery." Journal of Cloud Computing 7 (2018): pp. 1-20. (Year: 2018).*

* cited by examiner

Primary Examiner — Joseph R Kudirka
(74) Attorney, Agent, or Firm — Joseph Mencher

(57) ABSTRACT

A workload resource device Service Level Agreement (SLA) failure remediation system includes a resource management system coupled to resource devices. The resource management system receives a workload intent for performing a workload associated with SLA(s), and generates a Directed Acyclic Graph (DAG) that identifies a first resource device and second resource device(s) for performing the workload. Based on the DAG, the resource management system configures the first resource device and the second resource device(s) to perform the workload, and stores the DAG in at least one database. If the resource management system determines that the first resource device is not satisfying the SLA(s) during the performance of the workload, it uses a portion of the DAG associated with the first resource device to configure at least one of the resource devices to operate with the second resource device(s) to subsequently perform the workload such that the SLA(s) are satisfied.

20 Claims, 23 Drawing Sheets

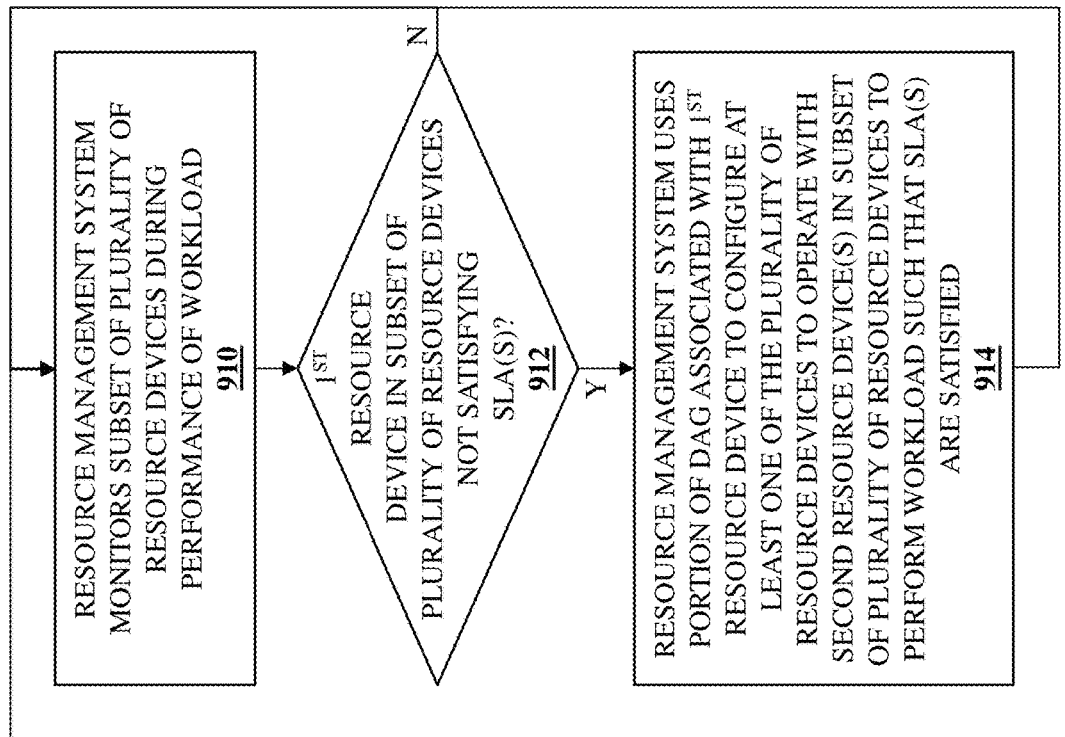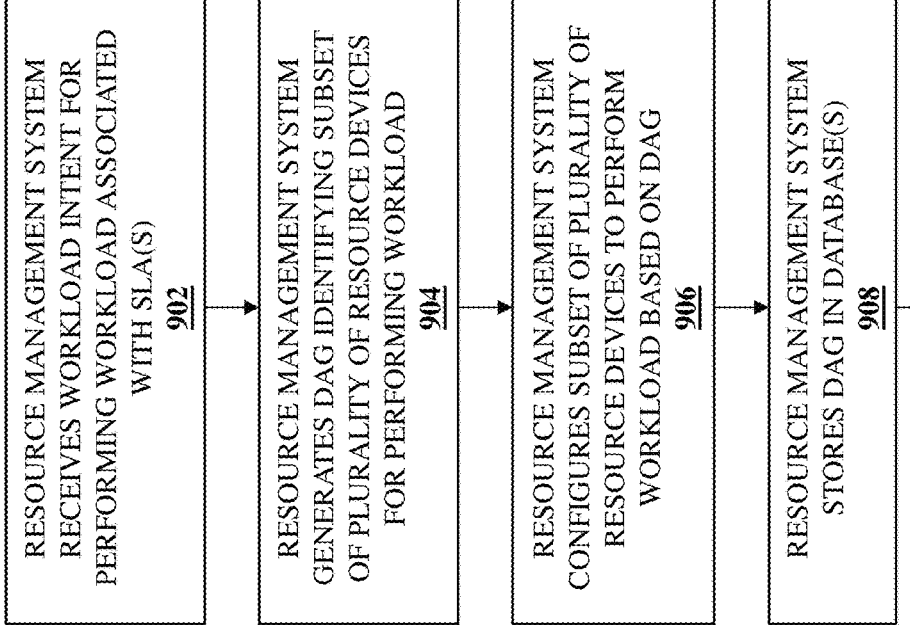
FIG. 9

WORKLOAD RESOURCE DEVICE SLA FAILURE REMEDIATION SYSTEM

BACKGROUND

The present disclosure relates generally to information handling systems, and more particularly to remediating a failure to satisfy a Service Level Agreement (SLA) by a resource device in an information handling system during its performance of a workload.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices (e.g., "Bare Metal Servers (BMSs)) and/or other computing devices known in the art, are often utilized to perform workloads. For example, a user or administrator may provide a request to perform a workload, a server device may be selected for performing that workload, and the resources of that server device may then be configured and subsequently used to perform that workload. However, as workload provisioning systems become more advanced and workload requests become more complicated, the number of resources and the complexity of their configuration required to perform workloads increases, particularly when such workloads are associated with Service Level Agreements (SLAs) that define minimum performance levels for particular functionality of the workload.

Furthermore, in the event of a failure of a resource to satisfy such SLAs during its performance of a workload, conventional workload provisioning systems may attempt a restart, reset, or other re-initialization of the server device being used to perform the workload, and in the event that does not remediate the issue, the workload provisioning system will select a different server device and/or resources and configure all of those resources (i.e., a "full rebuild") for use in subsequently performing that workload. As will be appreciated by one of skill in the art in possession of the present disclosure, both the re-initialization of a server device, or the selection and configuration of resources in a different server device, require a relatively significant amount of time that can exacerbate the failure to satisfy the SLAs, particularly when those SLAs require relatively quick recovery from such remediation operations in order to be satisfied.

Accordingly, it would be desirable to provide a workload resource device SLA failure remediation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a resource management engine that is configured to: receive a workload intent for performing a workload that is associated with at least one Service Level Agreement (SLA); generate a Directed Acyclic Graph (DAG) that identifies a first resource device in a plurality of resource devices and at least one second resource device in the plurality of resource devices for performing the workload; configure, based the DAG, the first resource device and the at least one second resource device to perform the workload; store the DAG in at least one database; determine that the first resource device is not satisfying the at least one SLA during the performance of the workload; and use a portion of the DAG that is associated with the first resource device to configure at least one of the plurality of resource devices to operate with the at least one second resource device to subsequently perform the workload such that the at least one SLA is satisfied.

BRIEF DESCRIPTION OF THE DRAWINGS

FIG. 9 is a flow chart illustrating an embodiment of a method for remediating SLA failures by a resource device during its performance of a workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
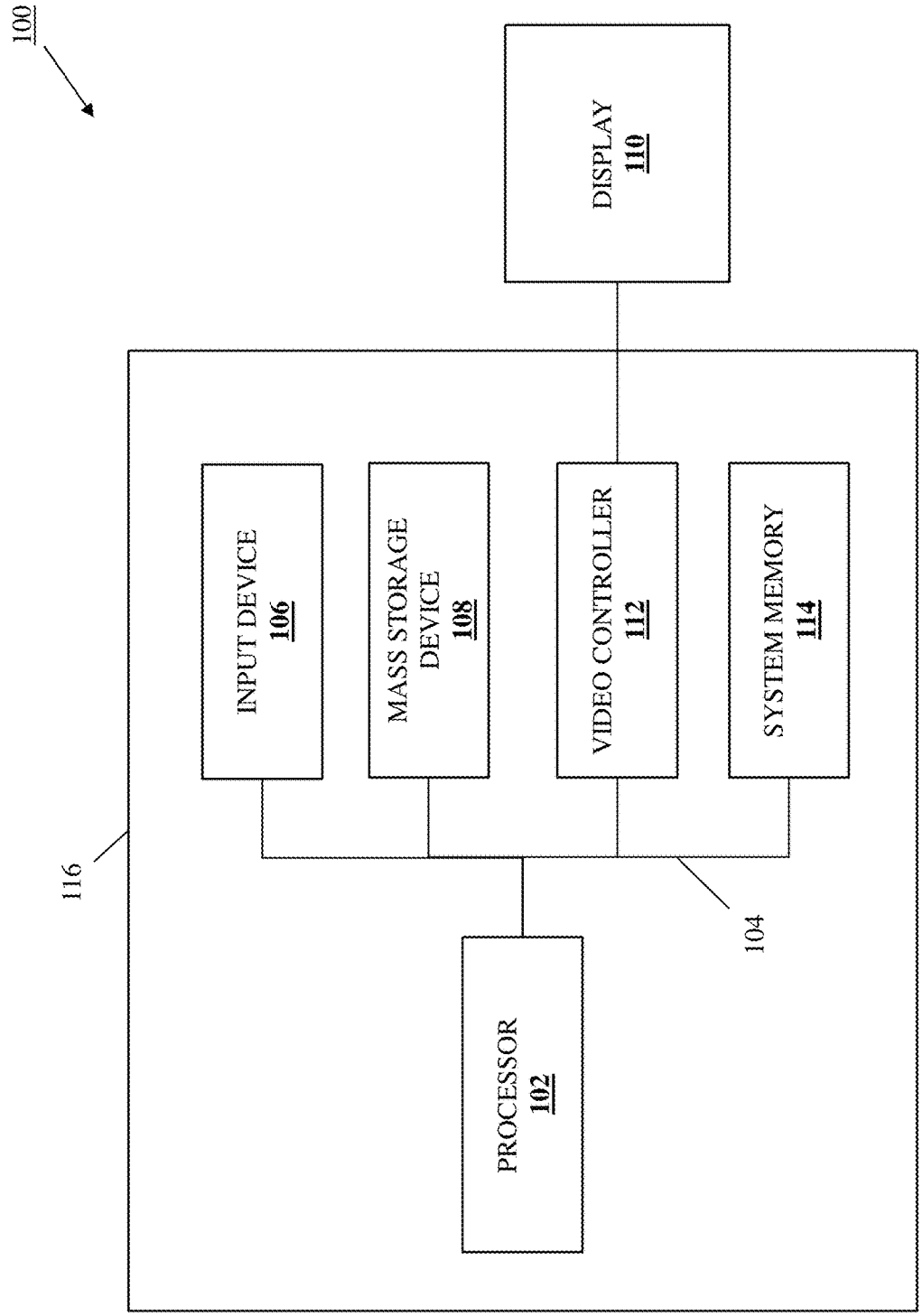
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the workload resource device SLA failure remediation systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
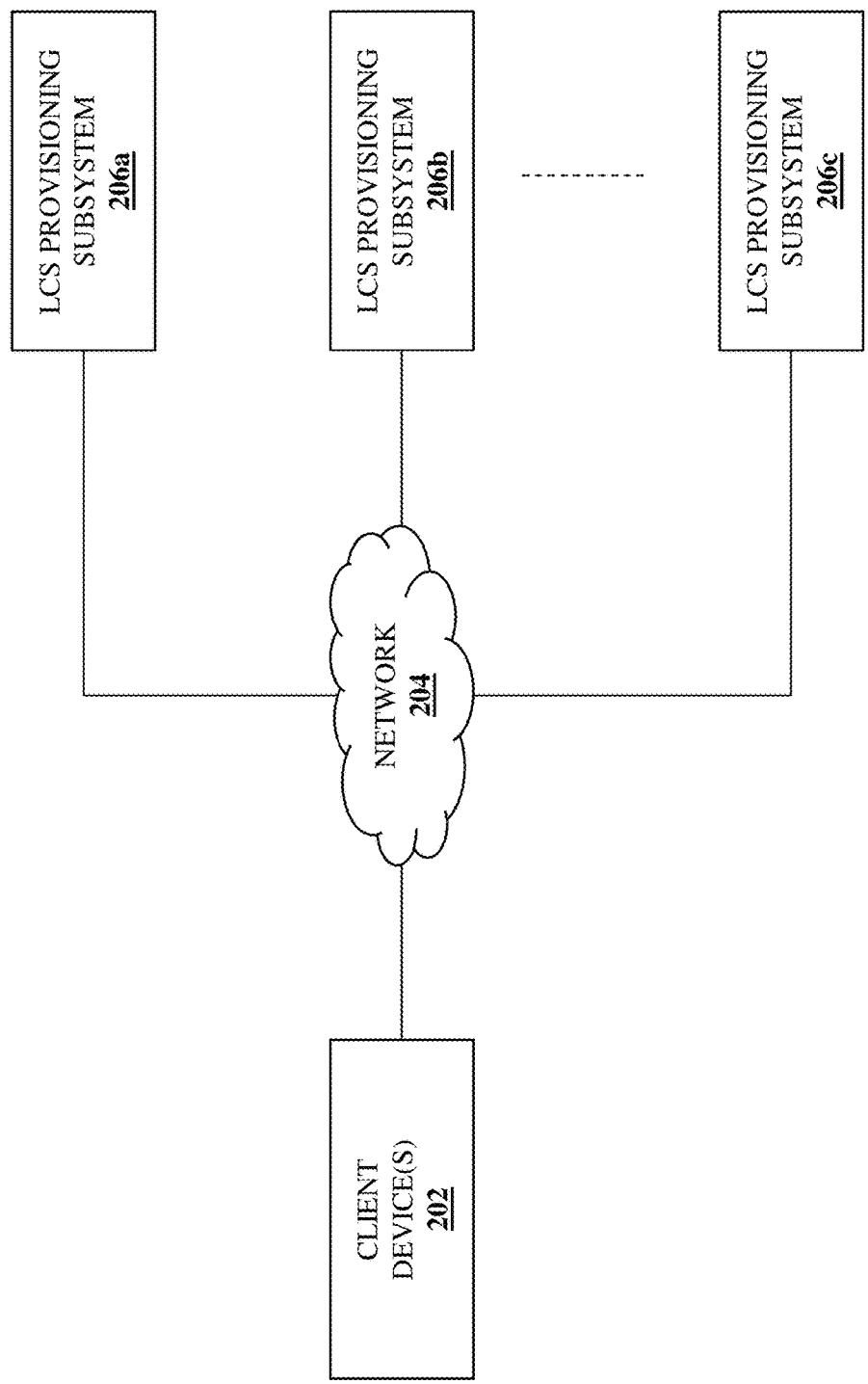
FIG. 2 is a schematic view illustrating an embodiment of an LCS provisioning system.

With reference to FIG. 2, an embodiment of a Logically Composed System (LCS) provisioning system 200 is illustrated that may be utilized with the workload resource device SLA failure remediation systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below.

In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
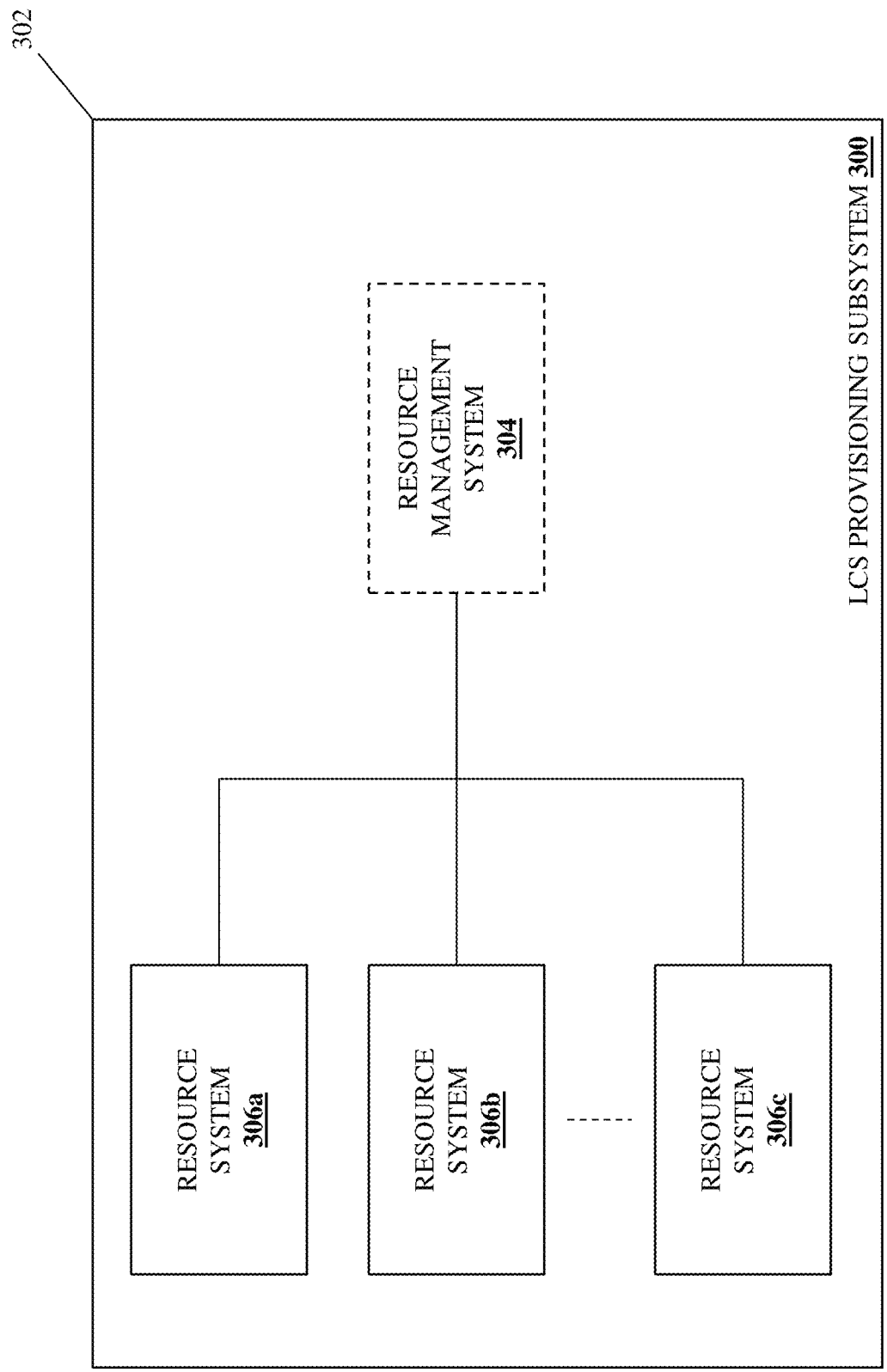
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
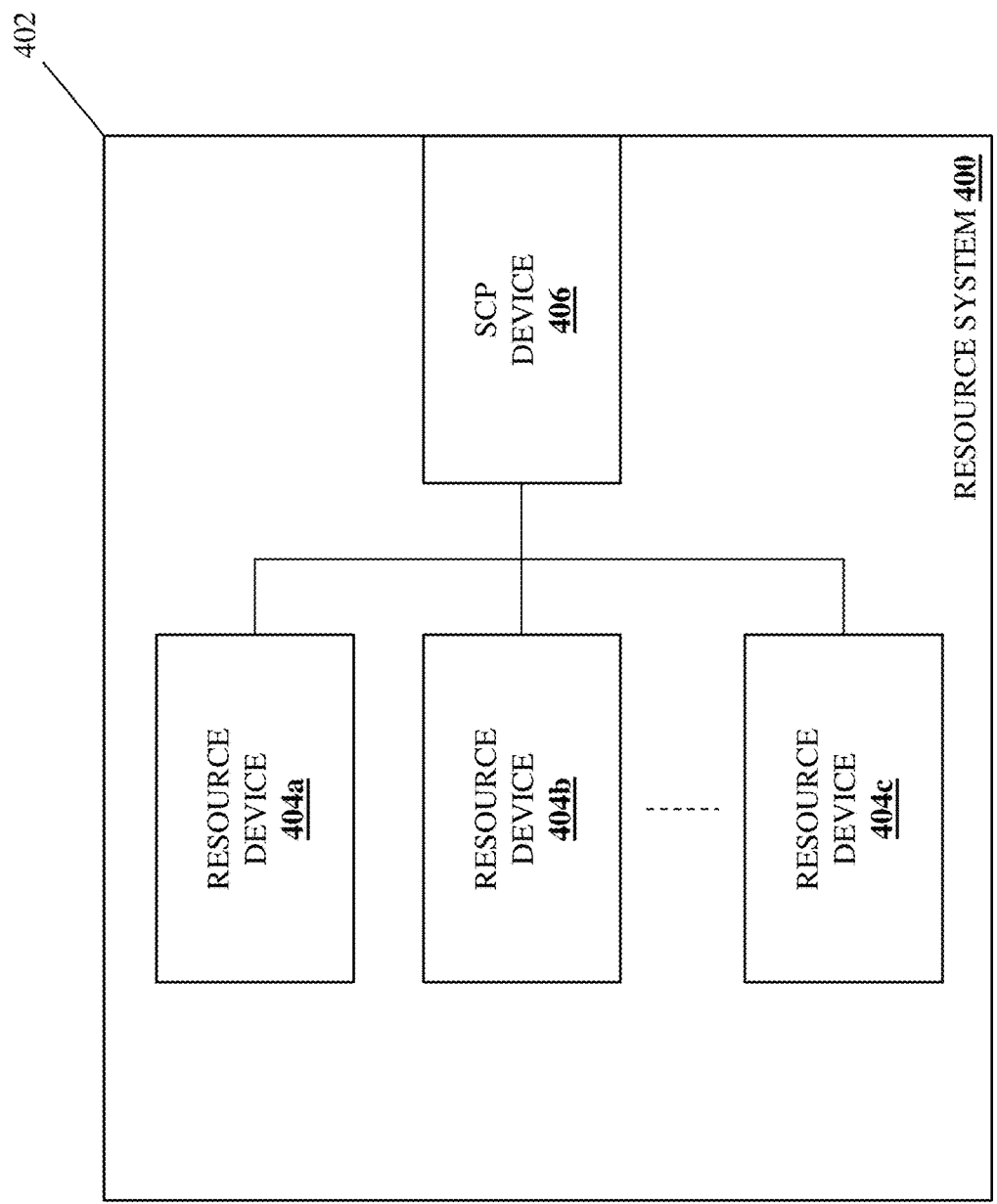
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
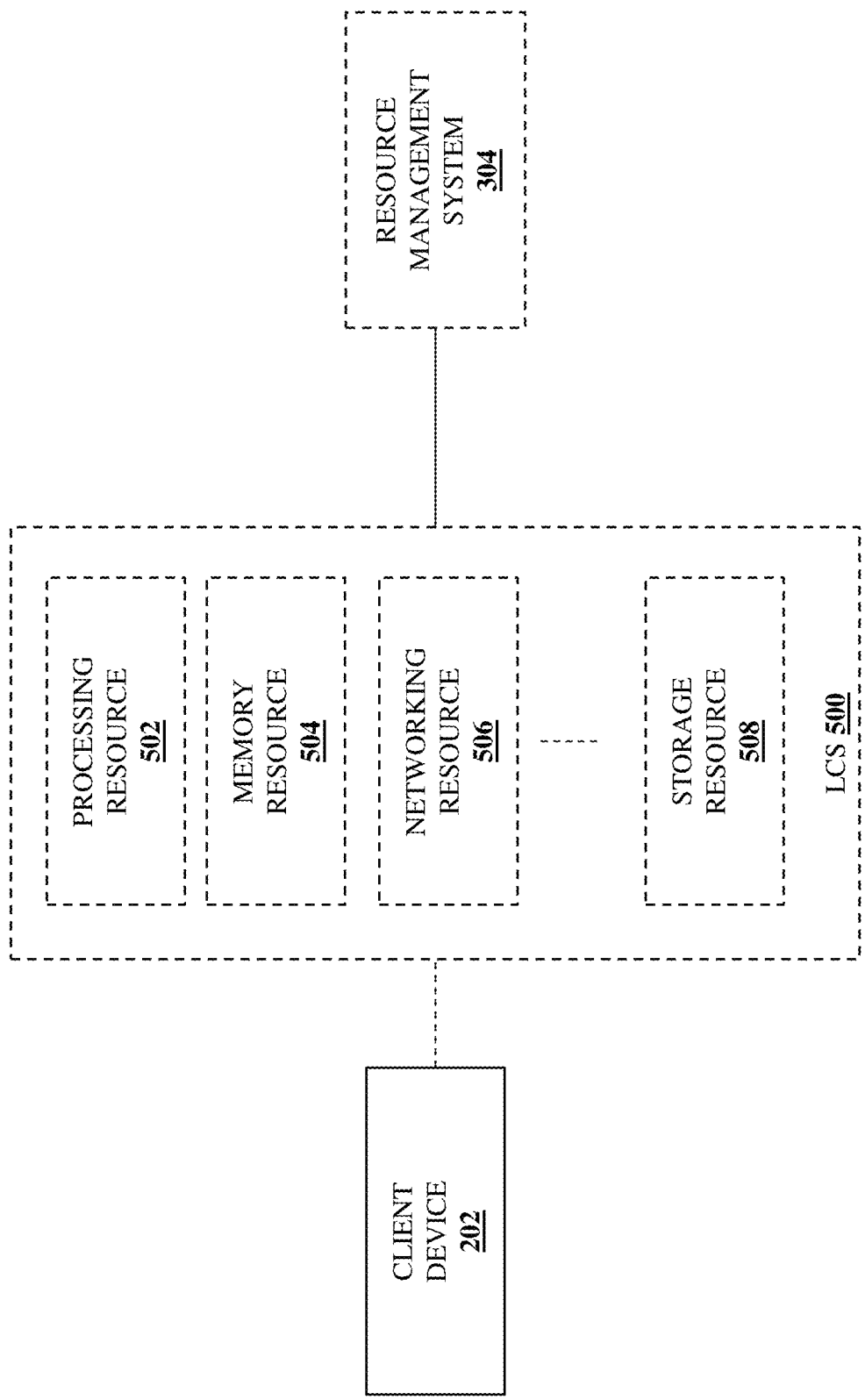
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
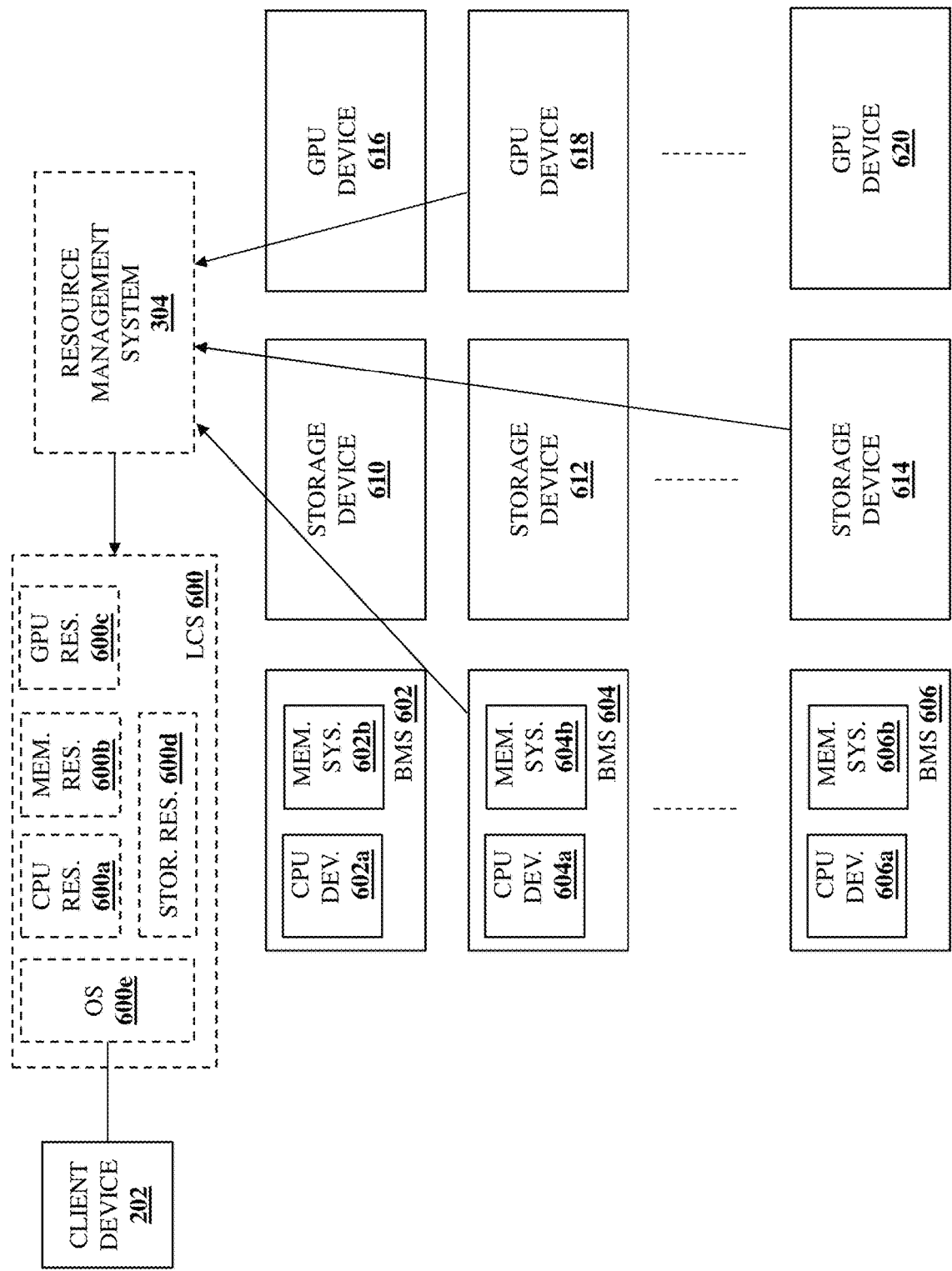
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
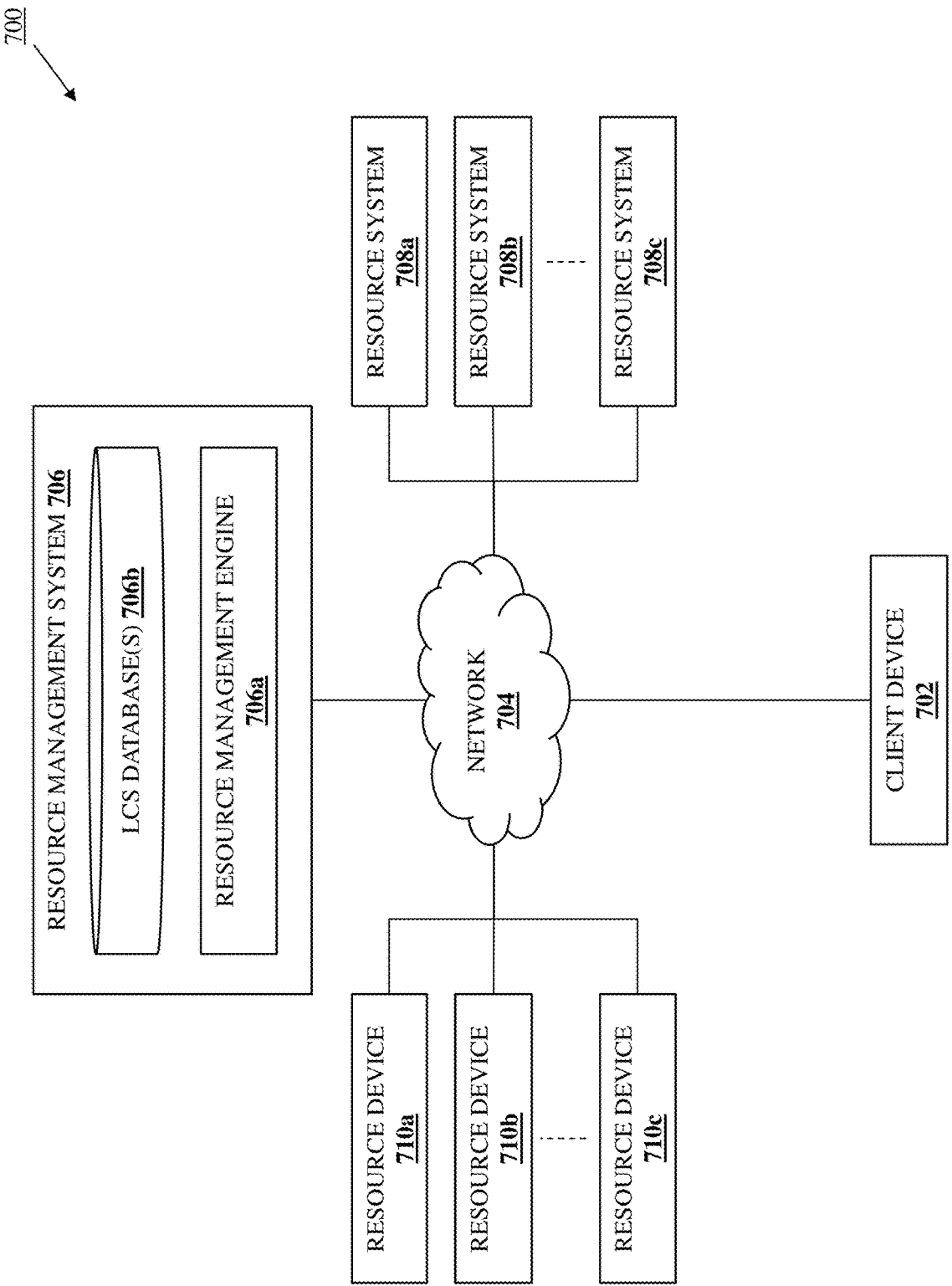
FIG. 7 is a schematic view illustrating an embodiment of networked system that may provide the workload resource device SLA failure remediation system of the present disclosure.

Referring now to FIG. 7, an embodiment of a networked system 700 is illustrated that may provide the workload resource device SLA failure remediation system of the present disclosure. In the illustrated embodiment, the networked system 700 may be provided using the LCS provisioning system 200 described above with reference to FIG. 2 and the LCS provisioning subsystem described above with reference to FIG. 3, and may operate similarly as described with reference to FIGS. 5 and 6. In the illustrated embodiment, the networked system 700 includes a client device 702 that may be provided by any of the client device(s) 202 described above with reference to FIG. 2. As illustrated, the client device(s) 202 are coupled to a network 704 that may be provided by a Local Area Network (LAN), the Internet, combinations thereof, and/or any other network that would be apparent to one of skill in the art in possession of the present disclosure. The networked system 700 in the embodiments illustrated and described below also includes a resource management system 706 that is coupled to the network 704 and that may be provided by the resource management system 304 of FIGS. 3, 5, and/or 6.

In the illustrated embodiment, the networked system 700 includes a plurality of resource systems 708a, 708b, and up to 708c that may be provided by the resource systems 306a, 306b, and up to 306c described above with reference to FIG. 3 and the resource system 400 described above with reference to FIG. 4. Finally, networked system 700 in the embodiments illustrated and described below also includes a plurality of resource devices 710a, 710b, and up to 710c, any of which may be provided by the resource devices 404a, 404b, and up to 404c described above with reference to FIG. 4, the resource devices (i.e., the CPU devices, memory systems, storage devices, and GPU devices) described above with reference to FIG. 6, and/or any other resource devices that would be apparent to one of skill in the art in possession of the present disclosure. However, while a specific networked system 700 has been illustrated and described, one of skill in the art in possession of the present disclosure will recognize that networked systems providing the workload resource device SLA failure remediation system of the present disclosure may include a variety of components and/or component configurations for providing conventional networked system functionality, as well as the workload resource device SLA failure remediation functionality discussed below, while remaining within the scope of the present disclosure as well.

Figure 8:
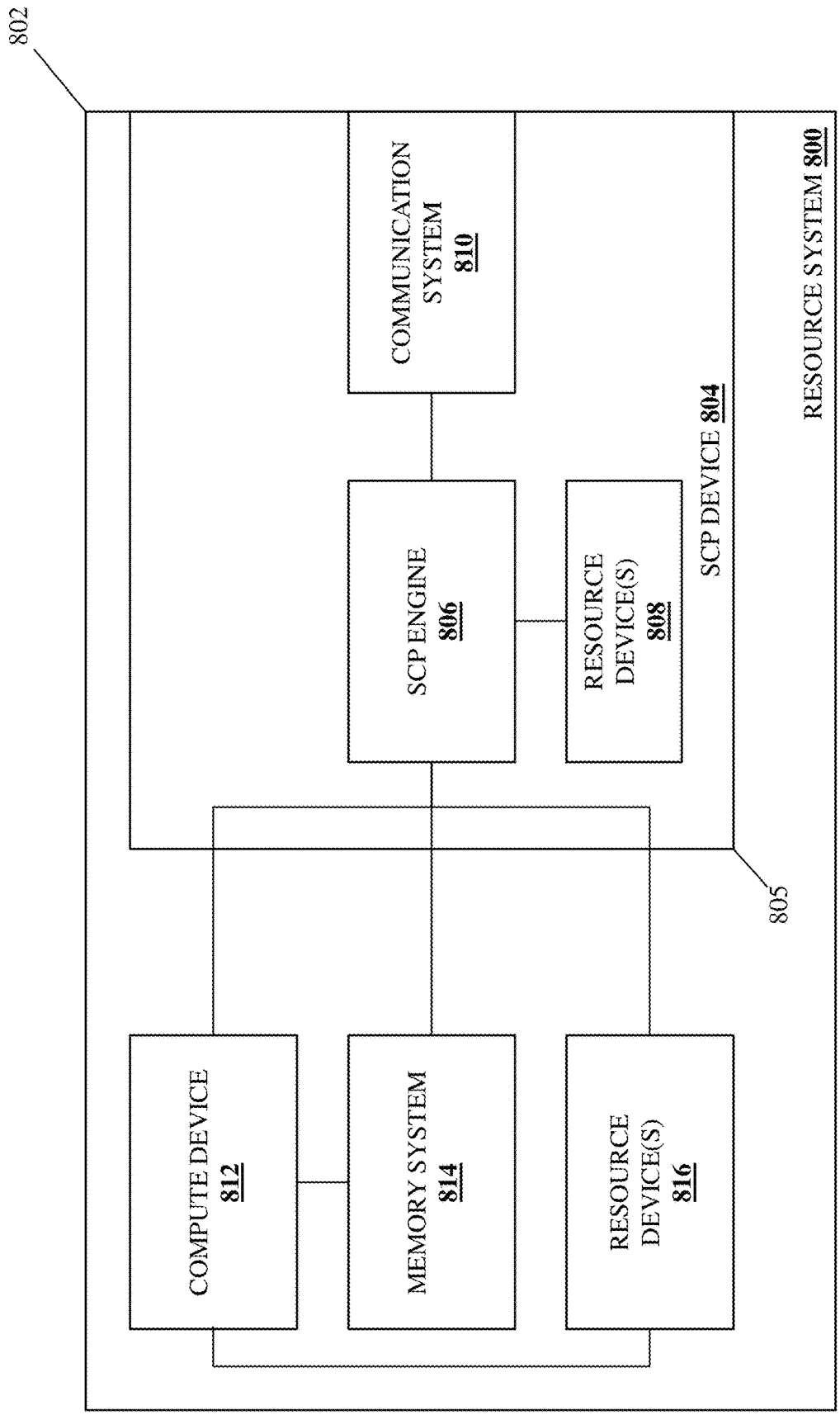
FIG. 8 is a schematic view illustrating an embodiment of a resource system that may be included in the networked system of FIG. 7.

Referring now to FIG. 8, an embodiment of a resource system 800 is illustrated that may provide any of the resource systems 708a-708c discussed above with reference to FIG. 7. As such, the resource system 800 may be provided by the IHS 100 discussed above with reference to FIG. 1 and/or may include some or all of the components of the IHS 100, and in specific examples may be provided by a BMS. However, while illustrated and discussed as being provided by a BMS, one of skill in the art in possession of the present disclosure will recognize that the functionality of the resource system 800 discussed below may be provided by other systems that are configured to operate similarly as the resource system 800 discussed below.

In the illustrated embodiment, the resource system 800 includes a resource system chassis 802 that houses the components of the resource system 800, only some of which are illustrated below. For example, the resource system chassis 302 may house an SCP device 804 that may be provided by the SCP device 406 described above. The SCP device 804 include an SCP chassis 805 (e.g., a circuit board) that supports the component of the SCP device 804, only some of which are illustrated and described below. For example, the chassis 805 may support an SCP processing system (not illustrated, but which may be similar to the processor 102 discussed above with reference to FIG. 1) and an SCP memory system (not illustrated, but which may be similar to the memory 114 discussed above with reference to FIG. 1) that is coupled to the SCP processing system and that includes instructions that, when executed by the SCP processing system, cause the SCP processing system to provide an SCP engine 806 that is configured to perform the functionality of the SCP engines and/or SCP devices discussed below.

The SCP chassis 805 may also support one or more resource devices 808 that are coupled to the SPC engine 806 (e.g., via traces in the circuit board that provides the chassis 805 and between the resource device(s) 808 and the SCP processing system) and that may be provided by any of the SCP device resource devices described above, as well as any other resource devices that would be apparent to one of skill in the art in possession of the present disclosure. The chassis 805 may also support a communication system 810 that is coupled to the SCP engine 806 (e.g., via traces in the circuit board that provides the chassis 805 and between the communication system 810 and the SCP processing system) and that may be provided by a Network Interface Controller (NIC), wireless communication systems (e.g., BLUETOOTH®, Near Field Communication (NFC) components, WiFi components, etc.), and/or any other SCP communication components that would be apparent to one of skill in the art in possession of the present disclosure. However, while a specific SCP device 804 has been illustrated and described, one of skill in the art in possession of the present disclosure will recognize that SCP devices (or other devices operating according to the teachings of the present disclosure in a manner similar to that described below for the SCP device 804) may include a variety of components and/or component configurations for providing conventional SCP device functionality, as well as the workload resource device SLA failure remediation functionality discussed below, while remaining within the scope of the present disclosure as well.

The resource system chassis 802 may also house a compute device 812 (e.g., the processor 102 discussed above with references to FIG. 1 such as, for example, a Central Processing Unit (CPU)) that is coupled to the SCP engine 806 in the SCP device 804 (e.g., via a coupling between the compute device 812 and the SCP processing system). The resource system chassis 802 may also house a memory system 814 (e.g., the memory 114 discussed above with references to FIG. 1 such as, for example, a Dynamic Random Access Memory (DRAM) devices) that is coupled to the compute device 812 and the SCP engine 806 in the SCP device 804 (e.g., via a coupling between the memory system 814 and the SCP processing system).

The chassis 302 may also house one or more resource device(s) 816 that are each coupled to the compute device 812 and the SCP engine 806 (e.g., via a coupling between the resource device(s) 816 and the SCP processing system) and that may be provided by any of the resource devices 404a-404c described above with reference to FIG. 4, as well as any other resource devices that would be apparent to one of skill in the art in possession of the present disclosure. However, while a specific resource system 800 has been illustrated and described, one of skill in the art in possession of the present disclosure will recognize that resource systems (or other systems operating according to the teachings of the present disclosure in a manner similar to that described below for the resource system 800) may include a variety of components and/or component configurations for providing conventional resource system functionality, as well as the workload resource device SLA failure remediation functionality discussed below, while remaining within the scope of the present disclosure as well.

Referring now to FIG. 9, an embodiment of a method 900 for remediating Service Level Agreement (SLA) failures by a resource device during its performance of a workload is illustrated. As discussed below, the systems and methods of the present disclosure provide for the use of a portion of a DAG that identifies resource devices for use in performing a workload in order to remediate the failure to satisfy any SLA(s) associated with that workload by any of the resource devices. For example, the workload resource device SLA failure remediation system of the present disclosure may include a resource management system coupled to resource devices. The resource management system receives a workload intent for performing a workload that is associated with SLA(s), and generates a DAG that identifies a first resource device and second resource device(s) for performing the workload. Based on the DAG, the resource management system configures the first resource device and the second resource device(s) to perform the workload, and stores the DAG in at least one database. If the resource management system determines that the first resource device is not satisfying the SLA(s) during the performance of the workload, it uses s portion of the DAG that is associated with the first resource device to configure at least one of the resource devices to operate with the second resource device(s) to subsequently perform the workload such that the SLA(s) are satisfied. As such, workload SLA failures may be remediated more quickly than in conventional workload provisioning systems that require the re-initialization of the resource system being used to perform the workload, or the selection and configuration of a different resource system in order to perform the workload.

Figure 10:
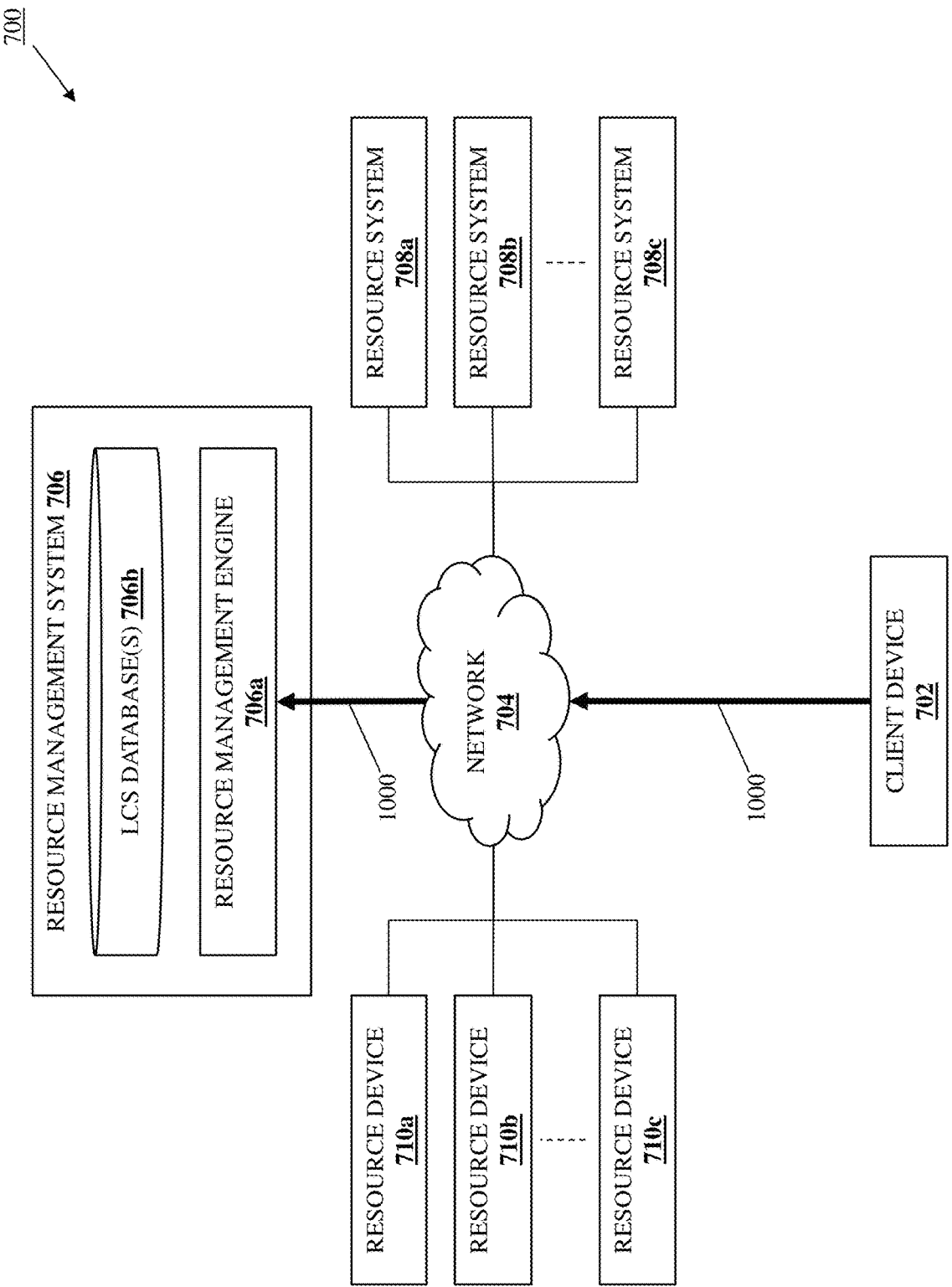
FIG. 10 is a schematic view illustrating an embodiment of the operation of the networked system of FIG. 7 during the method of FIG. 9.

The method 900 begins at block 902 where resource management system receives a workload intent for performing a workload associated with at least one SLA. With reference first to FIG. 10, in an embodiment of block 902, the client device 702 may perform workload request operations 1000 that may include generated and transmitting a workload intent via the network 704 to the resource management system 706 similarly as described above such that the resource management engine 706a receives the workload intent. In some of the specific examples provided below, the workload intent generated and transmitting by the client device 702 at block 902 includes a request to provide a workload that is associated with at least one Service Level Agreement (SLA), and one of skill in the art in possession of the present disclosure will appreciate how the SLAs described herein may be directly associated with the workload intent (e.g., a workload intent that specifies a minimum storage networking bandwidth for its storage system), may be implicitly associated with the workload intent (e.g., a workload intent that requests a "high-speed" storage system), may be indirectly associated with the workload intent (e.g., the workload intent may be provided by a user that pays for a minimum storage networking bandwidth for any storage system), and/or may be provided in any of a variety of manners that will fall within the scope of the present disclosure as well.

Figure 11A:
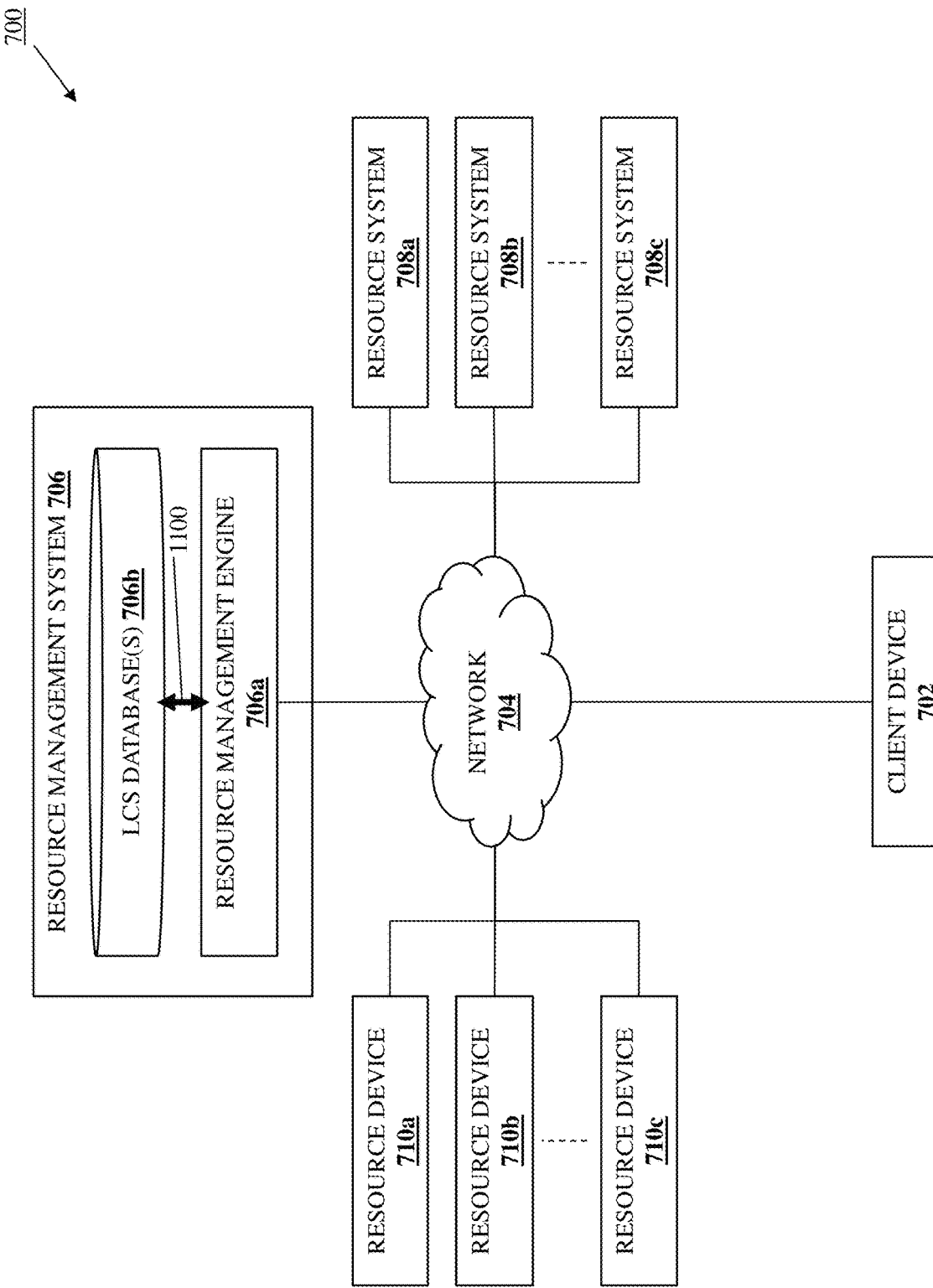
FIG. 11A is a schematic view illustrating an embodiment of the operation of the networked system of FIG. 7 during the method of FIG. 9.

The method 900 then proceeds to block 904 where the resource management system generates a DAG identifying a subset of a plurality of resource devices for performing the workload. With reference to FIG. 11A, in an embodiment of block 904 and in response to receiving the workload intent, the resource management engine 706a in the resource management system 706 may perform DAG generation operations 1100 that may include accessing a resource device database in one of the LCS database(s) 706b to identify a subset of 1) the resource devices 808 on the SCP devices 804 in the resource systems 708a-708c/800, 2) the resource devices 816 in the resource systems 708a-708c/800, and/or 3) the resource devices 710a-710c, that are capable of providing an LCS that performs the workload requested in the workload intent, as well as software for use with that subset of resource devices in performing the workload, and any other information that one of skill in the art in possession of the present disclosure would recognize as being required to provide the LCS described below.

To provide a specific example, the workload intent received at decision block 904 may request an LCS with both an I/O networking interface, as well as a storage networking interface with a "high-bandwidth" SLA (e.g., an LCS including an I/O network connection to a web server for customer data traffic, and a "high-bandwidth" storage network connection to a storage system that provides a data store for the web server), and at block 904 the resource management engine 706a may identify resource devices and corresponding software required to provide an LCS that includes storage device(s) that communicate via high-bandwidth networking interface(s). As will be appreciated by one of skill in the art in possession of the present disclosure, the selection and configuration of resource devices for such an LCS that are capable of satisfying such SLAs presents a multi-dimensional problem that requires multiple software services (e.g., software drivers, telemetry software, scheduling software, drift detection software, etc.) to solve. For example, any I/O request received via the I/O network connection described above may result in a read/write operation via the storage network connection, and the sharing of a networking interface discussed above (e.g., which may be provided by a single physical interface) by the I/O network connection and the storage network connection requires monitoring and enforcement of the SLAs discussed above using software that operates on networking hardware used to provide the LCS, and that accesses data traffic transmitted by that LCS.

As such, the generation of the DAG that identifies a subset of the 1) the resource devices 808 on the SCP devices 804 in the resource systems 708a-708c/800, 2) the resource devices 816 in the resource systems 708a-708c/800, and/or 3) the resource devices 710a-710c, may be configured to identify the subset of resource devices that are capable of providing the LCS that is configured to perform the workload requested in the workload intent, identify software for use with those resource devices to provide the LCS that performs the workload according their corresponding SLAs, identify hardware and software that may be configured to enforce those SLAs, and identify hardware and software that may be configured to rectify situations in which any of those SLAs are not being satisfied as described below. As will be appreciated by one of skill in the art in possession of the present disclosure, the initial generation of the DAG identifying the resource devices and software needed for an LCS that performs a requested workload (i.e., as opposed to any subsequent modification of that DAG to identify such resource devices and software) may provide an initial "best fit" of resource devices and software.

Figure 11B:
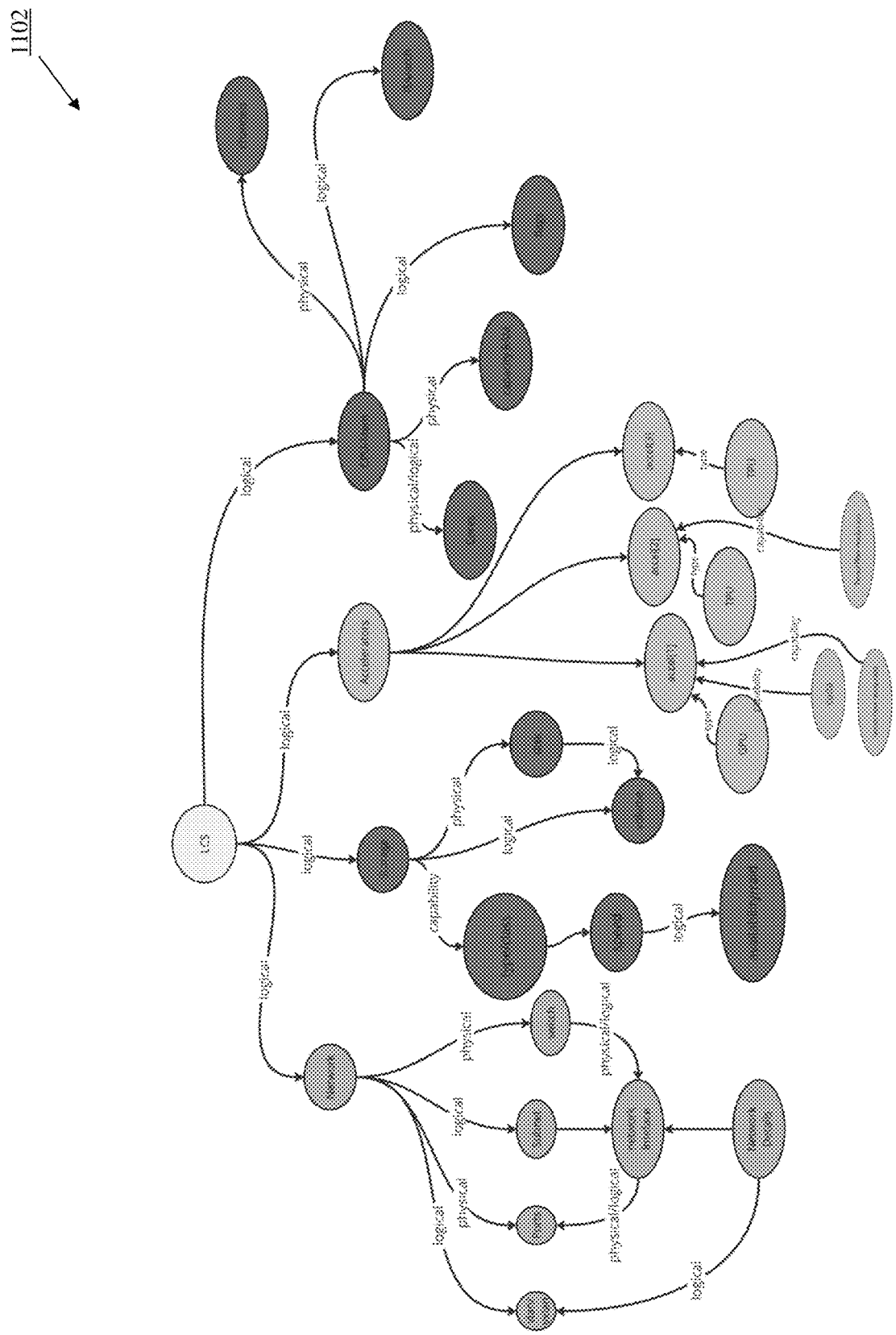
FIG. 11B is a graph view illustrating an embodiment of a DAG during the method of FIG. 9.

With reference to FIG. 11B, a specific example of a DAG 1102 that may be generated at block 904 is illustrated for an "LCS" that includes a "Network" portion, a "Storage" portion, an "Accelerators" portion, and a "CPU/Mem" portion. As described below, any of the portions of the DAG 1102 may be used to remediate SLA failures that occur during the method 900 (i.e., by reapplying/solving just that portion and without having to traverse the entire DAG/hierarchy of resource devices).

Figure 12A:
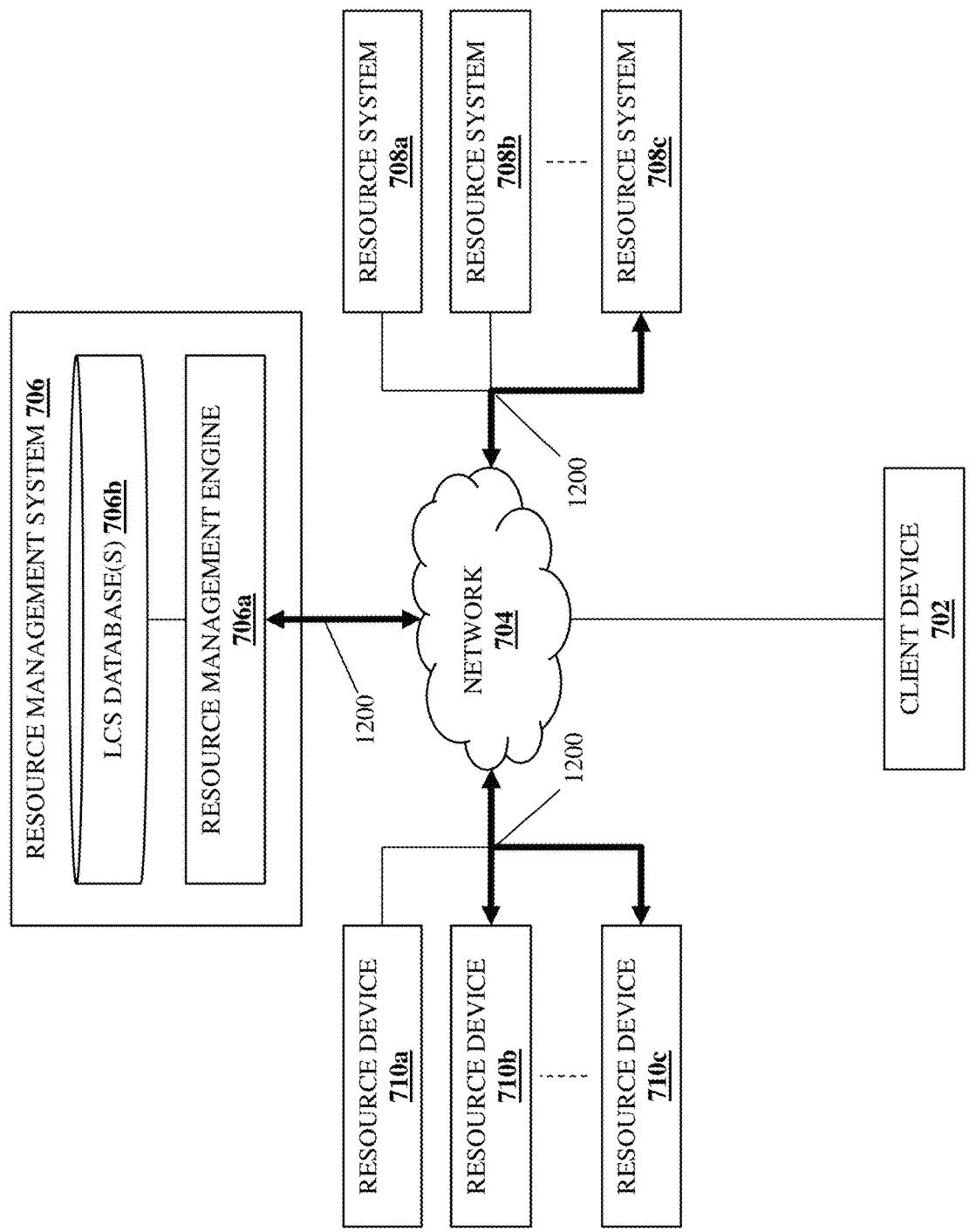
FIG. 12A is a schematic view illustrating an embodiment of the operation of the networked system of FIG. 7 during the method of FIG. 9.
Figure 12B:
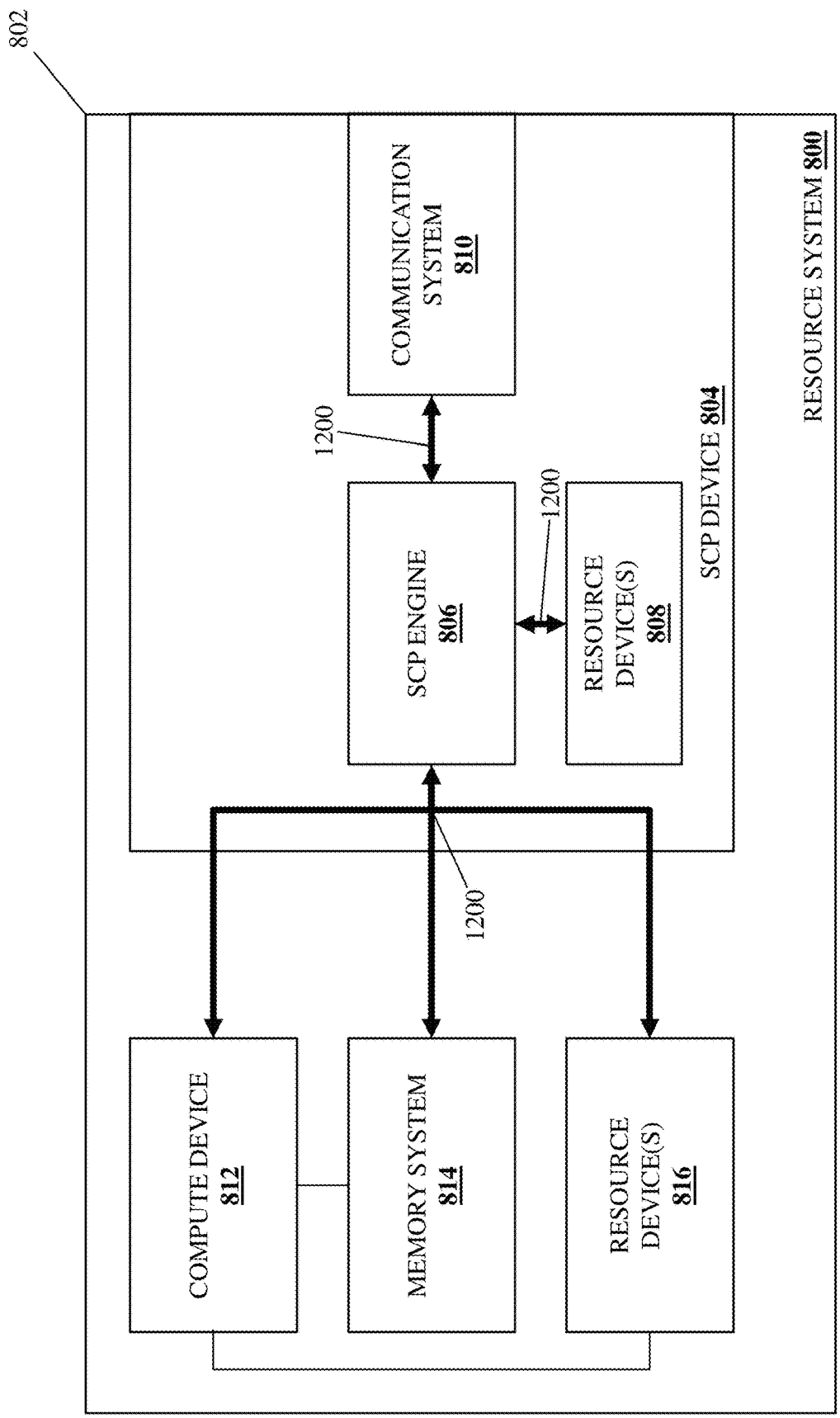
FIG. 12B is a schematic view illustrating an embodiment of the operation of the resource system of FIG. 8 during the method of FIG. 9.

The method 900 then proceeds to block 906 where the resource management system configures the subset of the plurality of resource devices to perform the workload based on the DAG. With reference to FIGS. 12A and 12B, in the specific example of block 906, the resource management engine 706a in the resource management system 706 may perform resource device configuration operations 1200 that include configuring the resource devices 710b and 710c via the network 704 to provide the LCS that performs the workload requested via the workload intent, and using the SCP engine 806 on the SCP device 804 in the resource system 708c/800 (via its communication system 810 and the network 704) to configure the resource device(s) 808 on the SCP device 804 and the compute device 812, the memory system 814, and the resource device(s) 816 in the resource system 708c/800o to provide the LCS that performs the workload requested via the workload intent. However, while a specific subset of resource devices are illustrated and described as being configured to provide an LCS that performs a particular workload to block 906, one of skill in the art in possession of the present disclosure will appreciate how the subset of resource devices configured to provide the LCS that performs a workload to block 906 may vary depending on the workload requested and the resource devices that are available to provide the LCS that performs it.

Figure 13:
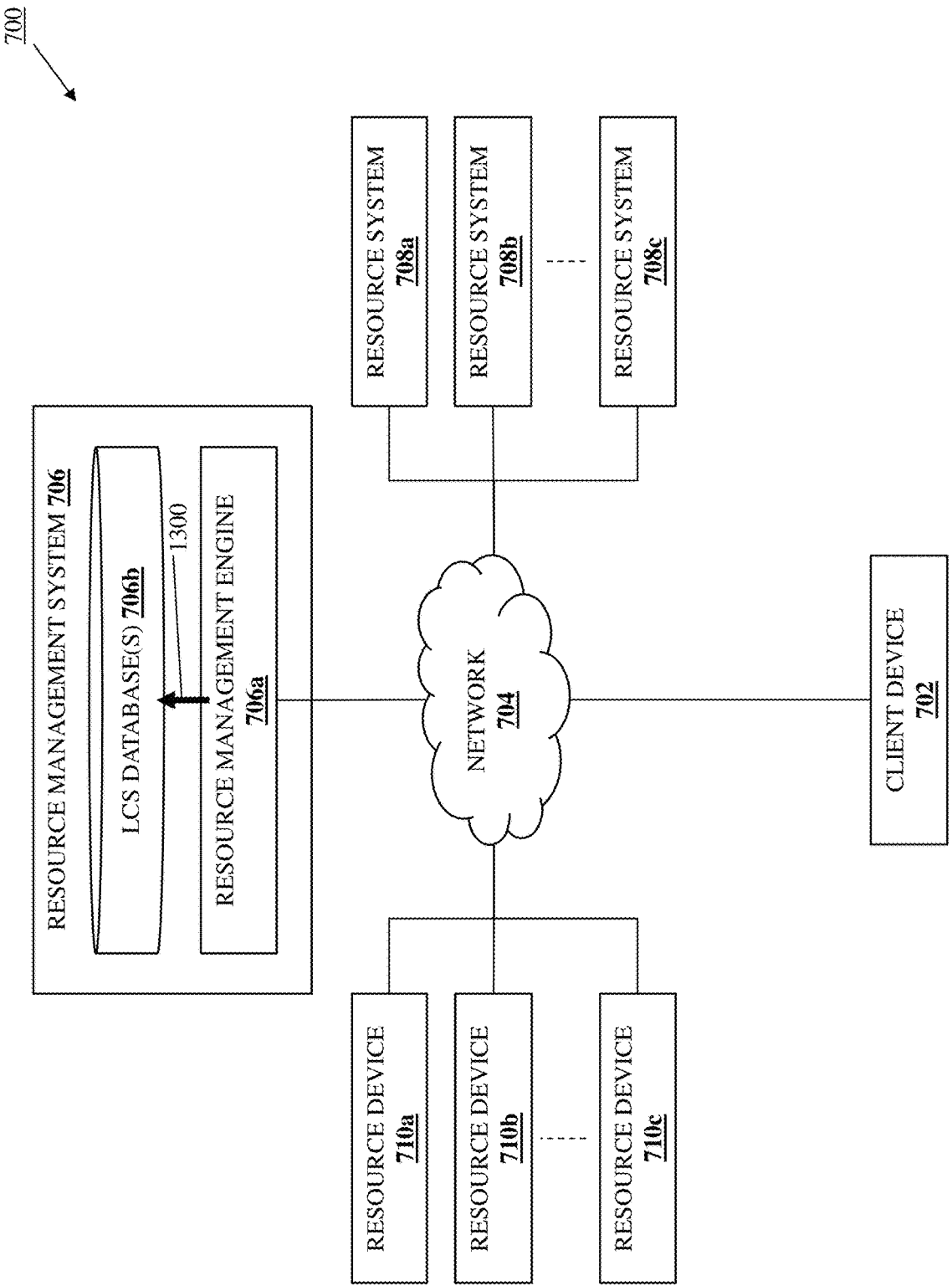
FIG. 13 is a schematic view illustrating an embodiment of the operation of the networked system of FIG. 7 during the method of FIG. 9.

The method 900 then proceeds to block 908 where the resource management system stores the DAG in at least one database. With reference to FIG. 13, in an embodiment of block 908, the resource management engine 706a in the resource management system 706 may perform DAG storage operations 1300 that may include storing the DAG that was generated at block 904 in the LCS database(s) 706b.

Figure 14A:
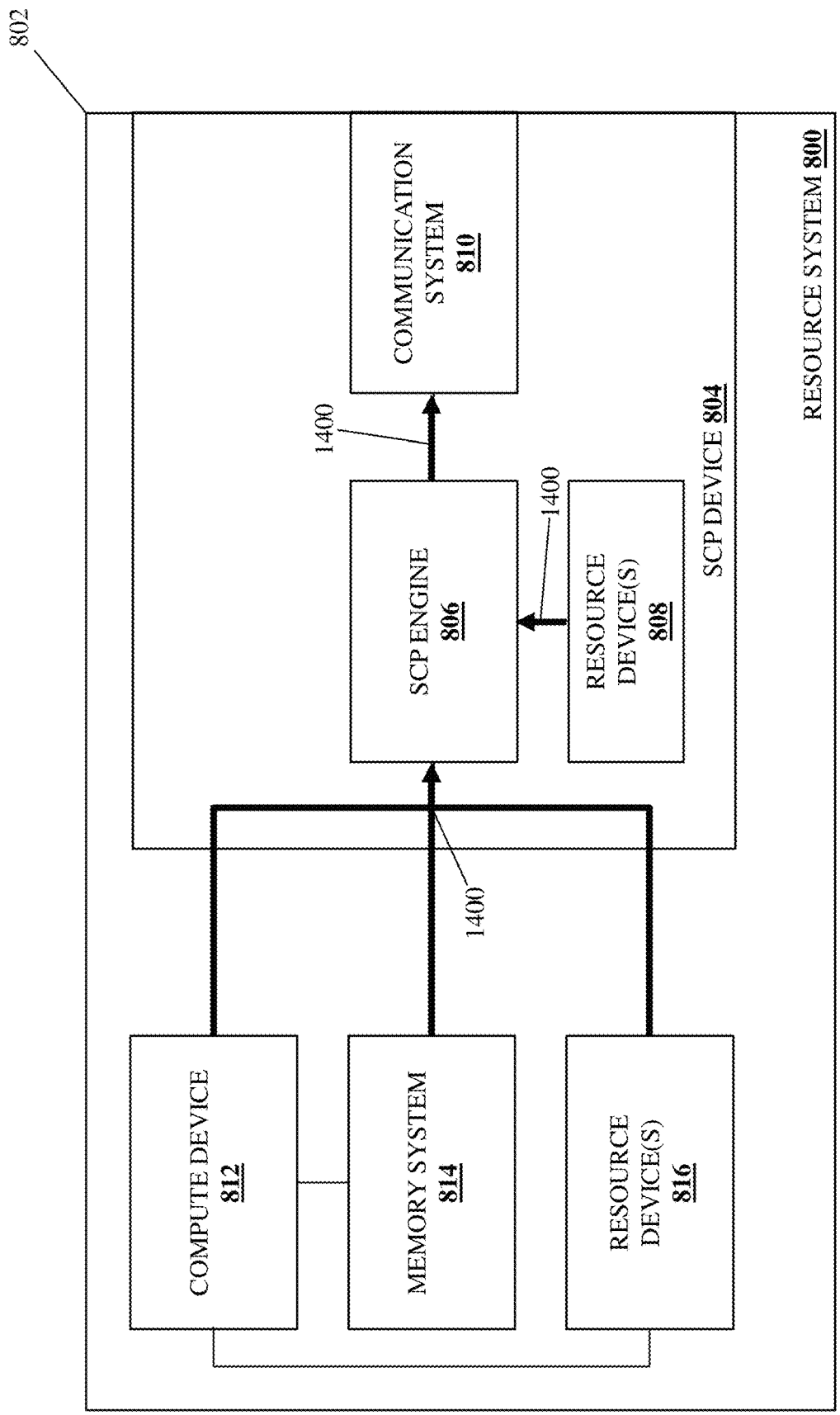
FIG. 14A is a schematic view illustrating an embodiment of the operation of the resource system of FIG. 8 during the method of FIG. 9.
Figure 14B:
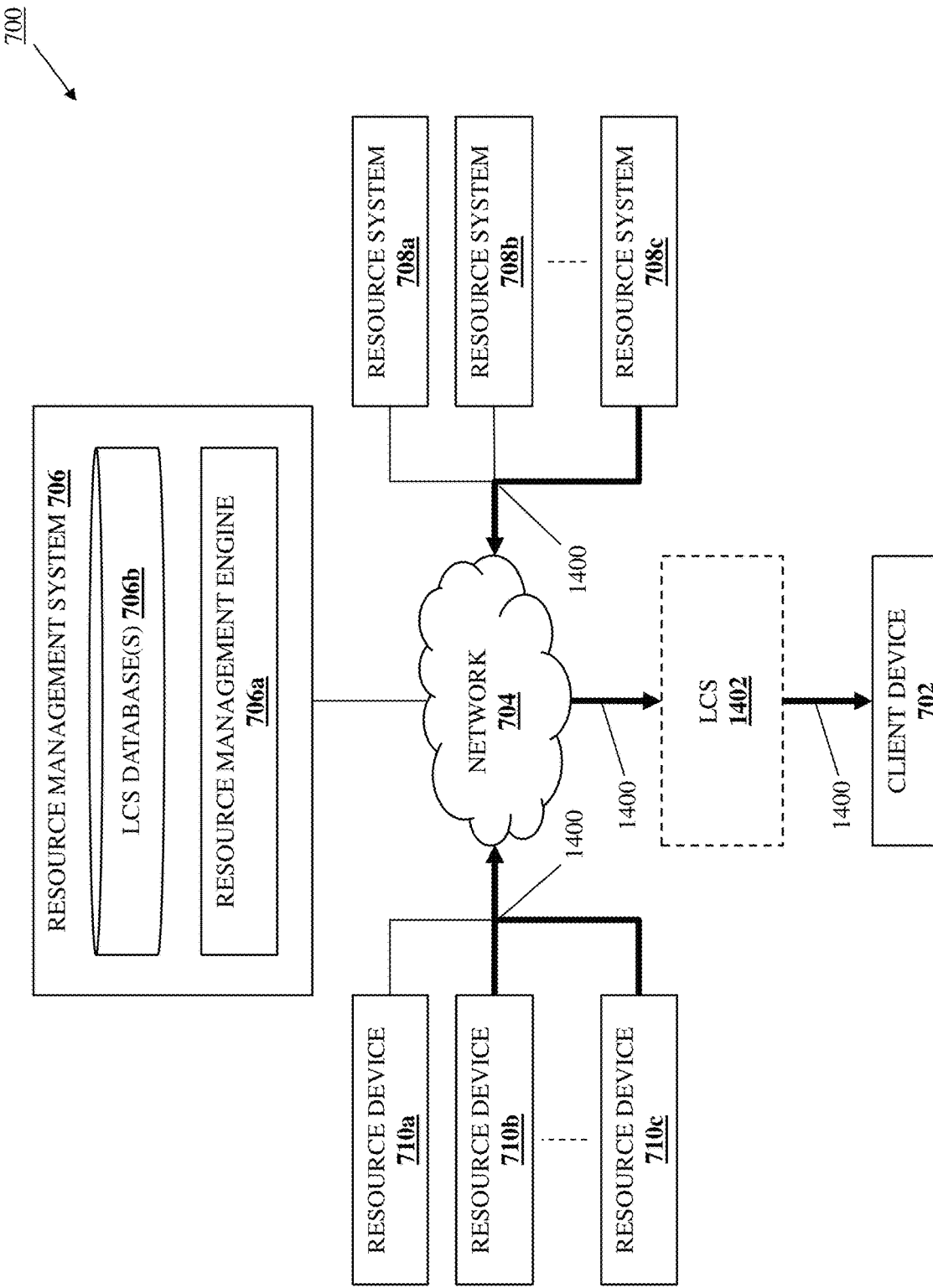
FIG. 14B is a schematic view illustrating an embodiment of the operation of the networked system of FIG. 7 during the method of FIG. 9.

The method 900 then proceeds to block 910 where the resource management system monitors the subset of the plurality of resource devices during performance of the workload. With reference to FIGS. 14A and 14B, in an embodiment of block 910 and following the configuration of the subset of the plurality of resource devices at block 906, the compute device 812, the memory system 814, and the resource device(s) 816 in the resource system 708c/800, the resource device(s) 808 on the SCP device 804 in the resource system 708c/800, and the resource devices 710b and 710c may perform LCS provisioning operations 1400 that include providing an LCS 1402 that performs the workload requested in the workload intent. As such, one of skill in the art in possession of the present disclosure will appreciate how each of the resource devices that were configured at block 906 may utilize the software configured at block 906 to provide the LCS 1402 that performs the workload at block 910, and that performance of the workload may be monitored using the monitoring hardware and software identified for those resource devices as well.

Figure 15A:
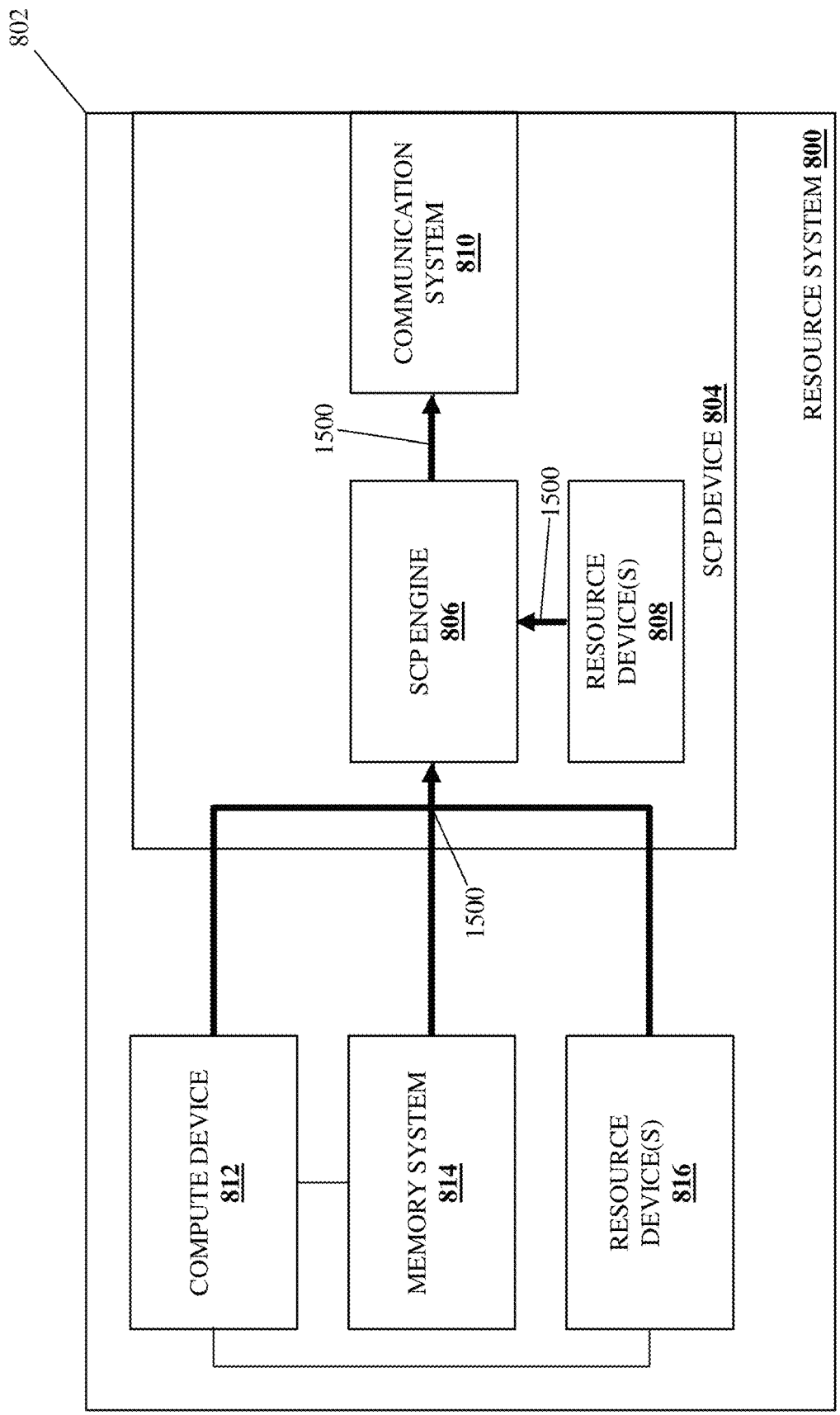
FIG. 15A is a schematic view illustrating an embodiment of the operation of the resource system of FIG. 8 during the method of FIG. 9.
Figure 15B:
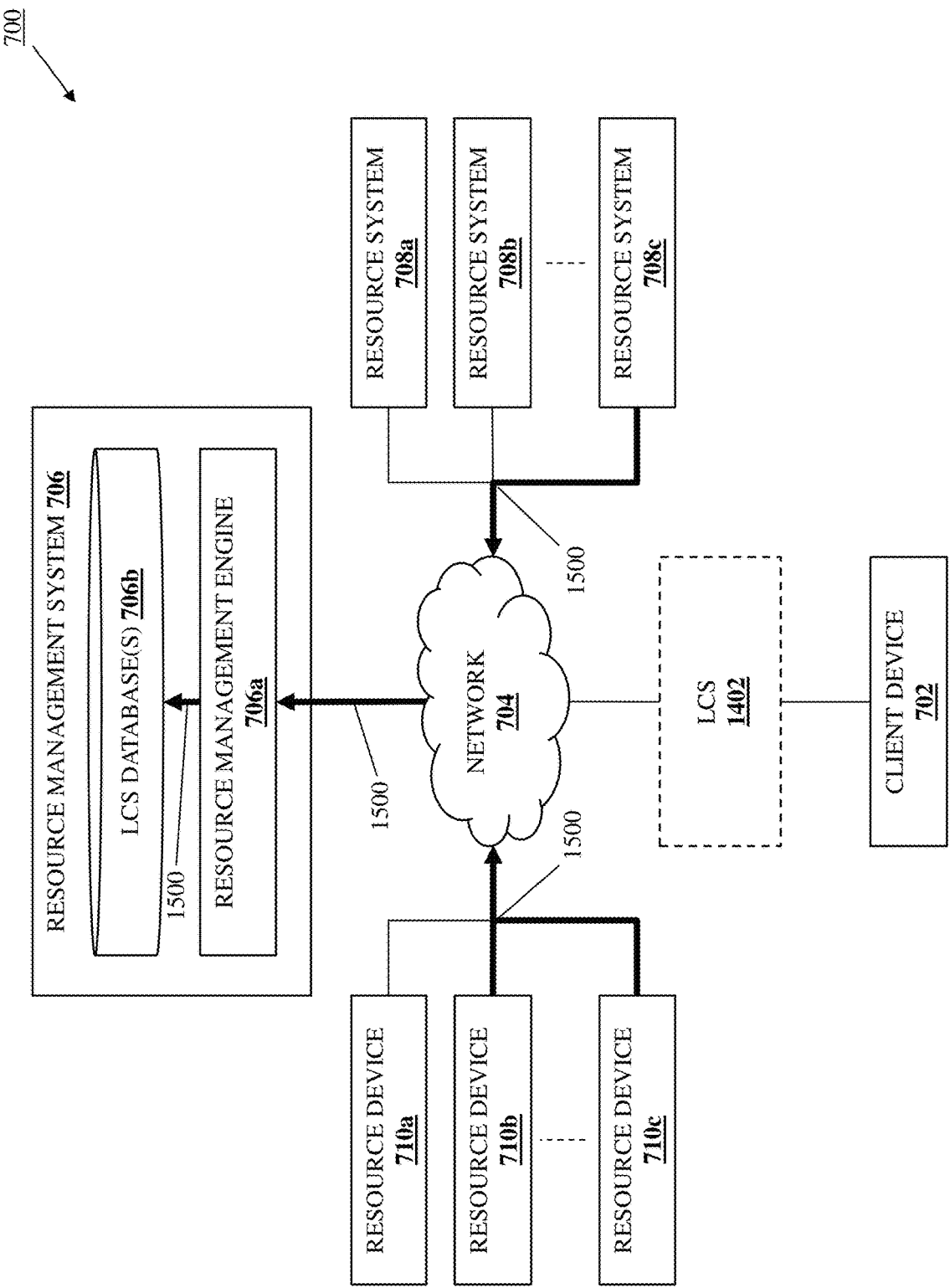
FIG. 15B is a schematic view illustrating an embodiment of the operation of the networked system of FIG. 7 during the method of FIG. 9.

With reference to FIGS. 15A and 15B, in an embodiment of block 910 and during the provisioning of the LCS 1402 by the subset of the plurality of resource devices at block 910, the resource management engine 706a in the resource management system 706 may perform resource device monitoring operations 1500 that include monitoring the compute device 812, the memory system 814, and the resource device(s) 816 in the resource system 708c/800 (e.g., using the SCP engine 806 on the SCP device 804 in the resource system 708c/800 via its communication system 810 and the network 704), the resource device(s) 808 on the SCP device 804 in the resource system 708c/800 (e.g., using the SCP engine 806 on the SCP device 804 in the resource system 708c/800 via its communication system 810 and the network 704), and the resource devices 710b and 710c. As such, one of skill in the art in possession of the present disclosure will appreciate how the monitoring hardware and software described above may operate with the resource devices configured at block 906 to allow the monitoring at block 910.

Furthermore, in some embodiments, the resource device monitoring operations 1500 by the resource management engine 706a may include storing monitoring information in the LCS database(s) 706c. For example, the resource device monitoring operations 1500 by the resource management engine 706a may include the receiving and/or retrieving of state information from any or all of the subset of resource devices being used to provide the LCS 1402 that identifies any details about a current state of that resource device that would be apparent to one of skill in the art in possession of the present disclosure, and storing that state information in the DAG that was generated at block 904. For example, in some embodiments, the DAG generated at block 904 with the initial "best fit" of resource devices and software for providing the LCS 1402 may be subsequently updated with state information (e.g., values in registers included in the hardware and/or stored by the software being used to provide the LCS 1402) from those resource devices and or software that identifies their current state during their provisioning of that LCS and its performance of the workload. As such, one of skill in the art in possession of the present disclosure will appreciate how the monitoring hardware and software described above may operate with the resource devices configured at block 906 to allow reporting of any of the state information described above.

As will be appreciated by one of skill in the art in possession of the present disclosure, the state of any resource device may vary depending on how that resource device is currently being used to provide the LCS 1402 that performs the workload. For example, in addition to the current state provided by state information as described herein, an expected/desired state may be provided by state information that details how a newly deployed resource device is expected to operate, and a transition state may be provided by state information that details any transition between resource devices that previously provided an LCS that performs a workload and resource devices that will subsequently perform that workload. As such, while a current state of resource devices is described below, one of skill in the art in possession of the present disclosure will appreciate how the state information discussed herein may describe a variety of states of a resource device while remaining within the scope of the present disclosure as well.

The method 900 then proceeds to decision block 912 where it is determined whether a first resource device in the subset of the plurality of resource devices is not satisfying the SLA(s). In an embodiment, at decision block 912 and as part of the monitoring of the subset of the plurality of resource devices during the provisioning of the LCS 1402 that is performing the workload, the resource management engine 706a in the resource management system 706 may determine whether any of that subset of resource devices is not satisfying any of the SLA(s) for the workload (e.g., whether the storage system provided for the LCS during its performance of the workload is utilizing a storage networking bandwidth that is below a minimum storage networking bandwidth level, or is otherwise operating in a manner that would not be considered "high-bandwidth"). However, while the monitoring of the satisfaction of a specific SLA has been described, one of skill in the art in possession of the present disclosure will appreciate how the satisfaction of any of a variety of SLAs may be monitored for at decision block 912 while remaining within the scope of the present disclosure as well.

In a specific example, the detection that a resource device is not satisfying a SLA for a workload may be performed using a "drift solver" subsystem provided by the resource management engine 706a that utilizes the monitoring information received from the resource devices and the SLA(s) for the workload that are included in the DAG stored in the LCS database(s) 706a to detect and isolate any resource device that is responsible for a failure to satisfy an SLA of a workload. As such, the monitoring information retrieved or received from each resource (e.g., the state information received for a storage device as described above) may be compared to associated SLAs included in the DAG to determine whether the operation of any particular resource device has "drifted" from a corresponding SLA more than a threshold amount (e.g., the storage networking bandwidth utilized by a storage device has "drifted" more than a threshold amount from a minimum storage networking bandwidth).

If, at decision block 912, it is determined that each of the plurality of resource devices is satisfying the SLA(s), the method 900 returns to block 910. As such, the method 900 may loop such that the subset of the plurality of resource devices continues to provide the LCS 1402 that performs the workload, and the resource management engine 706a in the resource management system 706 continues to monitor that subset of the plurality of resource device during the performance of the workload as described above until any of those resource devices is identified as not satisfying the SLA(s) for the workload.

Figure 16:
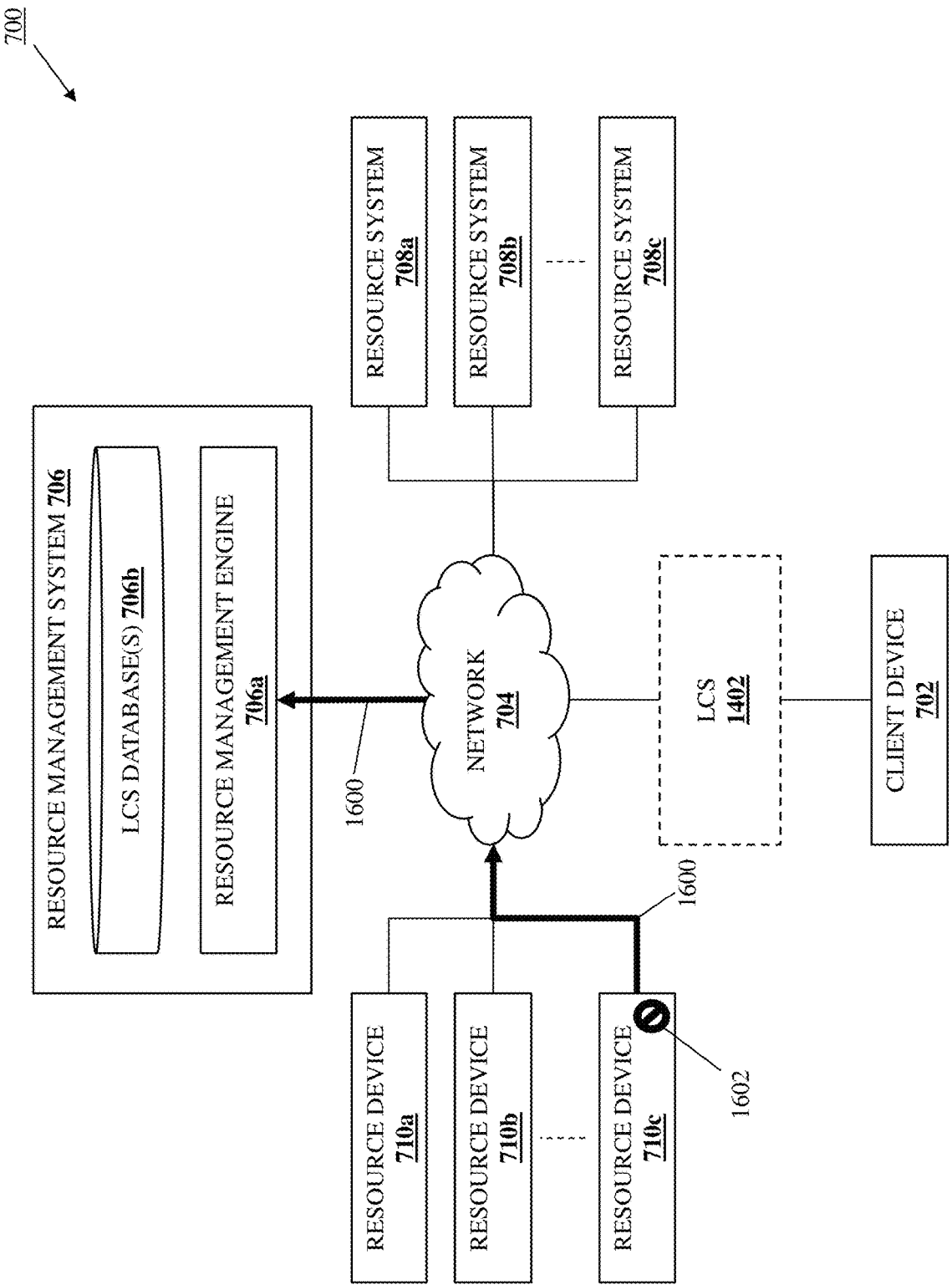
FIG. 16 is a schematic view illustrating an embodiment of the operation of the networked system of FIG. 7 during the method of FIG. 9.

If, at decision block 912, it is determined that a first resource device in the plurality of resource devices is not satisfying the SLA(s), the method 900 proceeds to block 914 where the resource management system uses a portion of the DAG associated with the first resource device to configure at least one of the plurality of resource devices to operate with one or more second resource devices in the subset of the plurality of resource devices to perform the workload such that the SLA(s) are satisfied. With reference to FIG. 16, in an embodiment of decision block 912, the resource management engine 706a in the resource management system 706 may perform SLA satisfaction failure determination operations 1600 that include determining via the network 704 that the resource device 710c is not satisfying one or more SLA(s) for the workload being performed by the LCS 1402 (as indicated by element 1602 in FIG. 16). Continuing with the example provided below, the resource device 710c may be a storage system with a "high bandwidth" SLA, and at decision block 912 the resource management engine 706a may determine that the resource device 710c/storage system is not able to utilize a minimum storage networking bandwidth that satisfies the "high bandwidth" SLA.

In another example, at decision block 912, the resource management engine 706a may determine that the resource device 710c/storage system has experienced a software workload error/crash that has prevented or degraded its operation such that SLA(s) for the workload are no longer being satisfied. In yet another example, at decision block 912, the resource management engine 706a may determine that the resource device 710c/storage system has prevented the booting or other initialization of the LCS 1402. However, while several specific examples of SLA satisfaction failures have been described, one of skill in the art in possession of the present disclosure will appreciate how SLAs may not be satisfied for a variety of reasons that may be determined at decision block 912 while remaining within the scope of the present disclosure.

Figure 17:
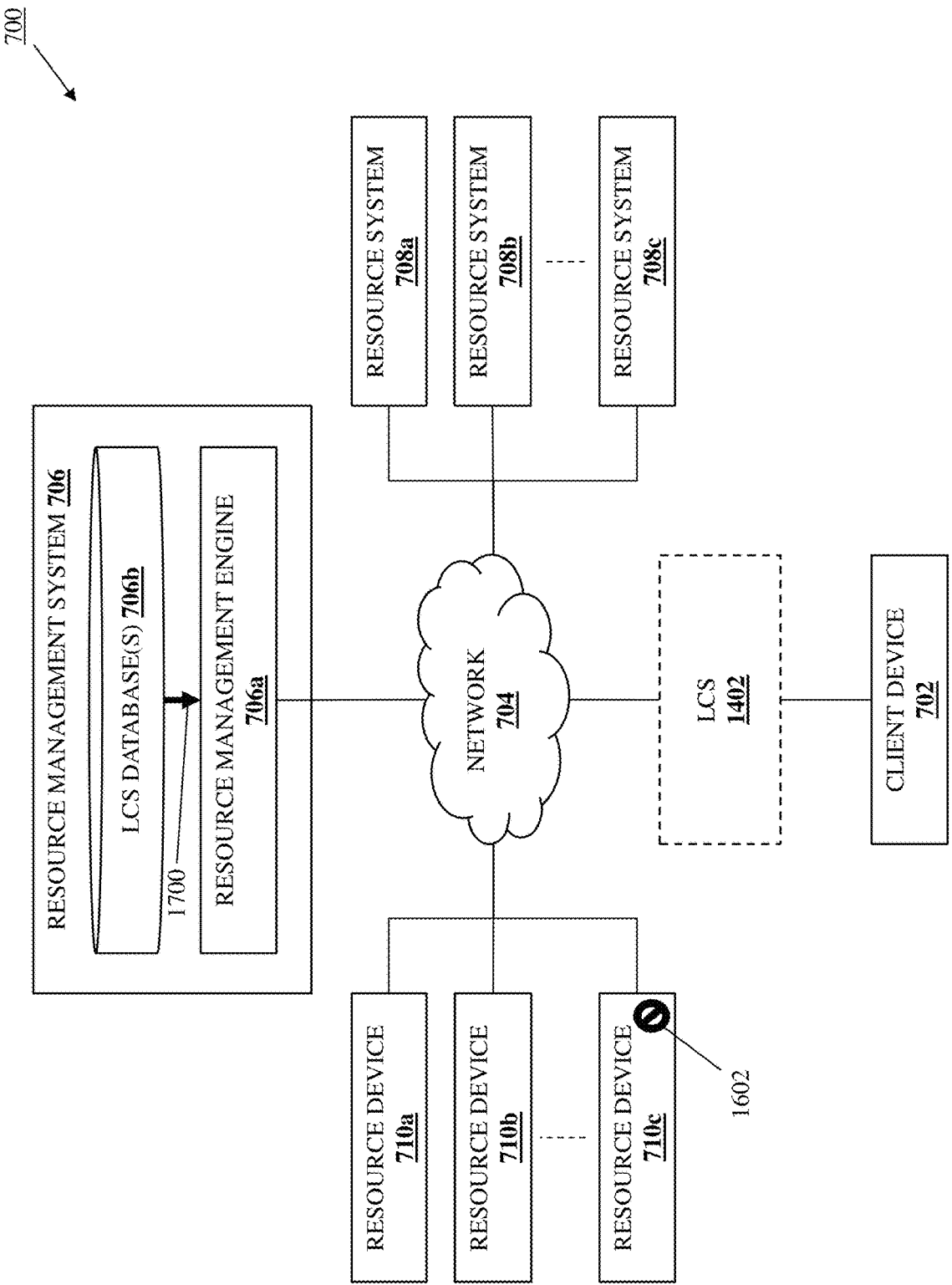
FIG. 17 is a schematic view illustrating an embodiment of the operation of the networked system of FIG. 7 during the method of FIG. 9.

With reference to FIG. 17, in an embodiment of block 914 and in response to determining that the resource device 710c is not satisfying the SLA for the workload being performed by the LCS 1402, the resource management engine 706a in the resource management system 706 may perform DAG access operations 1700 that include accessing the DAG in the LCS database(s) 706b that was generated at block 904 as described above, and retrieving a portion of the DAG that is associated with the resource device 710c that is not satisfying the SLA for the workload being performed by the LCS 1402. As described below, the workload resource device SLA failure remediation system of the present disclosure allows for the use of only a portion of the DAG that was generated to block 904 to deploy the LCS 1402 (and subsequently updated during the operation of that LCS with state information of the resource devices that provide it) to remediate, rebuild, and/or otherwise recover from an SLA failure by a particular resource device by only performing remediation operations, rebuild operations, and/or other recovery operations that address the issues with that particular resource device (and in consideration of that most recent state of that resource device, software utilized with that resource device, user account(s) and policies associated with that resource device, etc.), thus preventing costly LCS re-initialization operations and/or LCS rebuild operations.

As will be appreciated by one of skill in the art in possession of the present disclosure, the portion of the DAG retrieved at block 914 may identify the resource device 710c, the software used with the resource device 710c in its provisioning of the LCS 1402 that performs the workload, the hardware and/or software required to monitor the provisioning of the LCS by the resource device 710c to determine whether the SLA(s) for the workload are satisfied, and the most recent state information retrieved from the resource device 710c in its provisioning of the LCS 1402 to perform the workload. However, while described as identifying hardware, software, and state information, one of skill in the art in possession of the present disclosure will appreciate how the portion of the DAG retrieved at block 914 may instead include metadata that points to that hardware, software, and state information, or that allows that hardware, software, and state information to be deduced (e.g., a user identifier, SLA identifier, a policy identifier, or other data in the DAG may point to a database including information about of users, SLAs, policies, and/or other information described below).

The resource management engine 706a may then use the portion of the DAG retrieved at block 914 to configure at least one of its accessible resource devices to operate with at least some of the subset of the plurality of resource devices that were configured to block 906 to provide the LCS 1402 that performs the workload such that the SLA(s) are satisfied. As will be appreciated by one of skill in the art in possession of the present disclosure, the type of SLA failure detected at decision block 912 will dictate how the portion of the DAG retrieved at block 914 will be used at block 914 to configure a resource device to operate with at least some of the subset of the plurality of resource devices that were configured to block 906 to provide the LCS 1402 that performs the workload such that the SLA(s) are satisfied. To provide a greatly simplified example using the DAG 1102 discussed above with reference to FIG. 11B, in the event a storage system provided using the "Storage" portion of the DAG fails to satisfy an SLA for the workload, that "Storage" portion may be replaced so that the specific hardware and software that was being used to provide storage capabilities for LCS may now be provided by different hardware and software (while continuing to provide networking, accelerator, and CPU/Mem functionality by the hardware and software identified in the "Network", "Accelerators" and "CPU/Mem" portions of the DAG 1102).

Figure 18A:
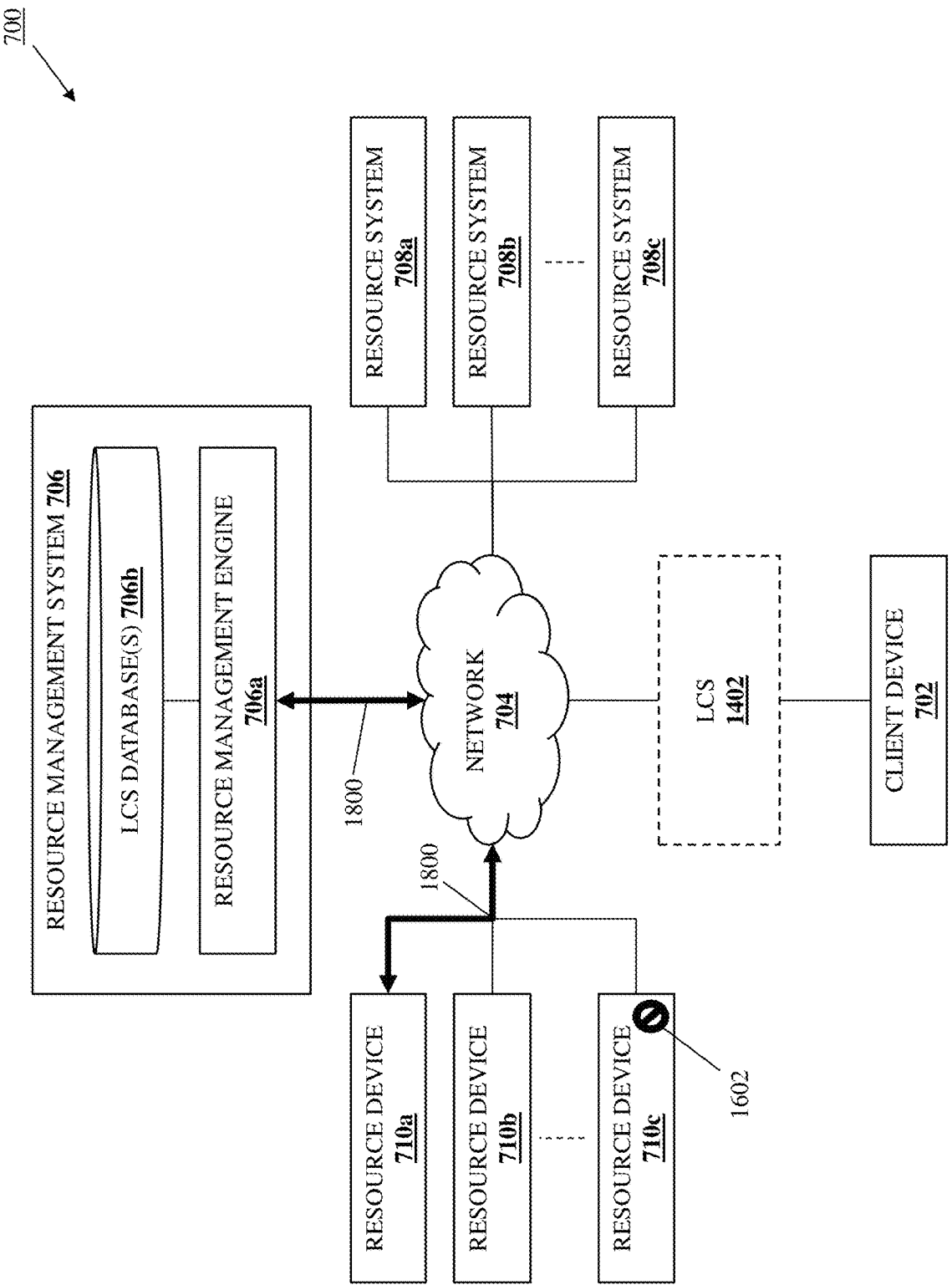
FIG. 18A is a schematic view illustrating an embodiment of the operation of the networked system of FIG. 7 during the method of FIG. 9.

With reference to FIG. 18A, in a first embodiment in which the resource device 710c has failed, is otherwise unavailable, and/or cannot be remediated to satisfy the SLA(s) for the workload, the resource management engine 706a may use the portion of the DAG retrieved at block 914 to perform resource device configuration operations 1800 that include determining the resource device 710a is a resource device identified in the portion of the DAG as being capable of providing the LCS 1402 to perform the portion of the workload that was previously provided by the resource device 710c, identifying the software in the portion of the DAG that may be used with the resource device 710c to provide the LCS 1402, retrieving the most recent state information for the resource device 710c from the portion of the DAG, and identifying the hardware and software in the portion of the DAG that is required to ensure that the SLA(s) for the workload are satisfied.

The resource device configuration operations 1800 performed by the resource management engine 706a may then further include configuring the resource device 710a (i.e., with the remaining subset of resource devices other than the resource device 710c that were configured at block 906) to provide the LCS 1402 that performs the portion of the workload that was previously provided by the resource device 710c, configuring the software for use with the resource device 710a to provide the LCS 1402 (i.e., with the remaining subset of resource devices other than the resource device 710c that were configured at block 906 with the remaining portions of the DAG), and configuring the resource device 710a with the most recent state information from the resource device 710a (e.g., via the programming of registers in the resource device 710a using that state information) to allow the resource device 710a to begin operating as the resource device 710c was operating prior to its not satisfying the SLA(s) for the workload.

Figure 18B:
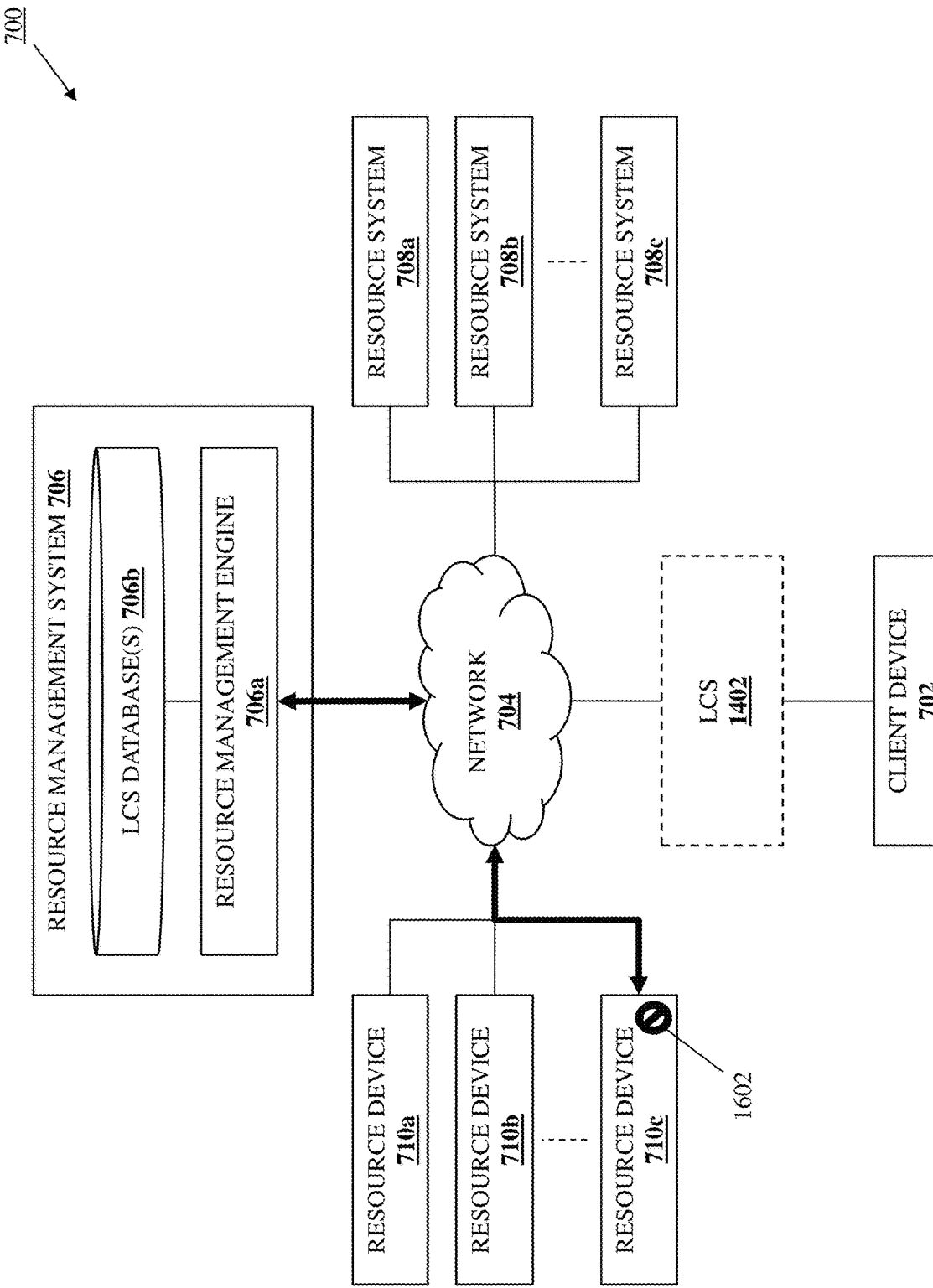
FIG. 18B is a schematic view illustrating an embodiment of the operation of the networked system of FIG. 7 during the method of FIG. 9.

With reference to FIG. 18B, in the event the LCS 1402 could not boot or otherwise initialize, the resource management engine 706a may use the portion of the DAG retrieved at block 914 to perform resource device configuration operations 1800 that include using the portion of the DAG to identify software that is used with the resource device 710c (e.g., a boot image) to provide the LCS 1402 that performs the workload, identify the storage size required on the storage system provided by the resource device 710c, and identify the mount path for the storage system provided by the resource device 710c. The resource device configuration operations 1800 performed by the resource management engine 706a may then further include retrieving the software used with the resource device 710c (e.g., the boot image) to provide the LCS 1402 for performing the workload, and reinstalling that software (e.g., "re-imaging the boot drive").

While two specific examples have been provided, one of skill in the art in possession of the present disclosure will appreciate how the portion of the DAG retrieved at block 914 may be used to identify the same resource device that was associated with the failure to satisfy the SLA and retry the desired state application for the resource that contributes to the LCS, identify a failure with an initially identified resource and "solve"/"find" a suitable replacement resource to take its place in that portion of the DAG, or identify an ordered list of resource devices so that backup resource devices are available for the resource device that failed to satisfy the SLA. As such, a new DAG need not be generated in response to a failure to satisfy an SLA, and instead a subset of resource devices may be identified to satisfy the SLA (while not necessarily being the "first"/"best" fit for the workload intent).

As such, one of skill in the art in possession of the present disclosure will appreciate how the operations performed at block 914 may provide for a quick recovery of the LCS 1402 in performing the workload while satisfying the SLA(s) for that workload, and without incurring the overhead associated with re-initializing the LCS 1402 or re-deploying the LCS 1402 via a "full rebuild" (and without having to "re-solve" the details of the software placement required to provide the LCS and monitor the operation of its resource devices). The method 900 then returns to block 910. As such, the resource management system 706 may operate to reconfigure its accessible resource devices using only a portion of the DAG when resource devices associated with those portions of the DAG fail to satisfy the SLA(s) for the workload. Thus, systems and methods have been described that provide for the use of a portion of a DAG that identifies resource devices for use in performing a workload in order to remediate the failure of any of those resource devices in satisfying SLA(s) associated with that workload. For example, the workload resource device SLA failure remediation system of the present disclosure may include a resource management system coupled to resource devices. The resource management system receives a workload intent for performing a workload that is associated with SLA(s), and generates a DAG that identifies a first resource device and second resource device(s) for performing the workload. Based on the DAG, the resource management system configures the first resource device and the second resource device(s) to perform the workload, and stores the DAG in at least one database. If the resource management system determines that the first resource device is not satisfying the SLA(s) during the performance of the workload, it uses s portion of the DAG that is associated with the first resource device to configure at least one of the resource devices to operate with the second resource device(s) to subsequently perform the workload such that the SLA(s) are satisfied. As such, workload SLA failures may be remediated more quickly than in conventional workload provisioning systems that require the re-initialization of the resource system being used to perform the workload, or the selection and configuration of a different resource system in order to perform the workload.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A workload resource device Service Level Agreement (SLA) failure remediation system, comprising:
   a plurality of resource devices; and
   a resource management system that is coupled to the plurality of resource devices and that is configured to:
      receive a workload intent for performing a workload that is associated with at least one SLA;
      generate a Directed Acyclic Graph (DAG) that identifies a first resource device in the plurality of resource devices and at least one second resource device in the plurality of resource devices for performing the workload;
      configure, based on the DAG, the first resource device and the at least one second resource device to perform the workload;
      store the DAG in at least one database;
      determine that the first resource device is not satisfying the at least one SLA during the performance of the workload; and
      use a portion of the DAG that is associated with the first resource device to configure at least one of the plurality of resource devices to operate with the at least one second resource device to subsequently perform the workload such that the at least one SLA is satisfied.

2. The system of claim 1, wherein the using of the portion of the DAG that is associated with the first resource device to configure the at least one of the plurality of resource devices to operate with the at least one second resource device to subsequently perform the workload such that the at least one SLA is satisfied includes:
   reconfiguring software used with the first resource device such that the first resource device operates with the at least one second resource device to subsequently perform the workload such that the at least one SLA is satisfied.

3. The system of claim 1, wherein the using of the portion of the DAG that is associated with the first resource device to configure the at least one of the plurality of resource devices to operate with the at least one second resource device to subsequently perform the workload such that the at least one SLA is satisfied includes:
   configuring a third resource device in the plurality of resource devices such that the third resource device operates with the at least one second resource device to subsequently perform the workload such that the at least one SLA is satisfied.

4. The system of claim 1, wherein the DAG identifies software for utilization with the first resource device and the at least one second resource device to perform the workload, and wherein the configuration of the first resource device and the at least one second resource device to perform the workload based on the DAG includes configuration of the software for use with the first resource device and the at least one second resource device.

5. The system of claim 1, wherein the resource management system is configured to:
   receive first state information for the first resource device and second state information for the at least one second resource device during their performance of the workload; and
   store the first state information and the second state information in the at least one database, wherein the using portion of the DAG that is associated with the first resource device to configure the at least one of the plurality of resource devices to operate with the at least one second resource device includes configuring the at least one of the plurality of resource devices with the first state information stored for the first resource device.

6. The system of claim 5, wherein the first state information and the second state information are stored in the DAG.

7. An Information Handling System (IHS), comprising:
a processing system; and
a memory system that is coupled to the processing system and that includes instructions that, when executed by the processing system, cause the processing system to provide a resource management engine that is configured to:
receive a workload intent for performing a workload that is associated with at least one Service Level Agreement (SLA);
generate a Directed Acyclic Graph (DAG) that identifies a first resource device in a plurality of resource devices and at least one second resource device in the plurality of resource devices for performing the workload;
configure, based on the DAG, the first resource device and the at least one second resource device to perform the workload;
store the DAG in at least one database;
determine that the first resource device is not satisfying the at least one SLA during the performance of the workload; and
use a portion of the DAG that is associated with the first resource device to configure at least one of the plurality of resource devices to operate with the at least one second resource device to subsequently perform the workload such that the at least one SLA is satisfied.

8. The IHS of claim 7, wherein the using of the portion of the DAG that is associated with the first resource device to configure the at least one of the plurality of resource devices to operate with the at least one second resource device to subsequently perform the workload such that the at least one SLA is satisfied includes:
reconfiguring software used with the first resource device such that the first resource device operates with the at least one second resource device to subsequently perform the workload such that the at least one SLA is satisfied.

9. The IHS of claim 7, wherein the using of the portion of the DAG that is associated with the first resource device to configure the at least one of the plurality of resource devices to operate with the at least one second resource device to subsequently perform the workload such that the at least one SLA is satisfied includes:
configuring a third resource device in the plurality of resource devices such that the third resource device operates with the at least one second resource device to subsequently perform the workload such that the at least one SLA is satisfied.

10. The IHS of claim 7, wherein the DAG identifies software for utilization with the first resource device and the at least one second resource device to perform the workload, and wherein the configuration of the first resource device and the at least one second resource device to perform the workload based on the DAG includes configuration of the software for use with the first resource device and the at least one second resource device.

11. The IHS of claim 7, wherein the resource management engine is configured to:
receive first state information for the first resource device and second state information for the at least one second resource device during their performance of the workload; and
store the first state information and the second state information in the at least one database, wherein the using portion of the DAG that is associated with the first resource device to configure the at least one of the plurality of resource devices to operate with the at least one second resource device includes configuring the at least one of the plurality of resource devices with the first state information stored for the first resource device.

12. The IHS of claim 11, wherein the first state information and the second state information are stored in the DAG.

13. The IHS of claim 7, wherein the storing the DAG in the at least one database includes storing initial state information for each of first resource device and the at least one second resource device for initially performing the workload.

14. A method for remediating Service Level Agreement (SLA) failures by a resource device during its performance of a workload, comprising:
receiving, by a resource management system, a workload intent for performing a workload that is associated with at least one SLA;
generating, by the resource management system, a Directed Acyclic Graph (DAG) that identifies a first resource device in a plurality of resource devices and at least one second resource device in the plurality of resource devices for performing the workload;
configuring, by the resource management system based on the DAG, the first resource device and the at least one second resource device to perform the workload;
storing, by the resource management system, the DAG in at least one database;
determining, by the resource management system, that the first resource device is not satisfying the at least one SLA during the performance of the workload; and
using, by the resource management system, a portion of the DAG that is associated with the first resource device to configure at least one of the plurality of resource devices to operate with the at least one second resource device to subsequently perform the workload such that the at least one SLA is satisfied.

15. The method of claim 14, wherein the using of the portion of the DAG that is associated with the first resource device to configure the at least one of the plurality of resource devices to operate with the at least one second resource device to subsequently perform the workload such that the at least one SLA is satisfied includes:
reconfiguring, by the resource management system, software used with the first resource device such that the first resource device operates with the at least one second resource device to subsequently perform the workload such that the at least one SLA is satisfied.

16. The method of claim 14, wherein the using of the portion of the DAG that is associated with the first resource device to configure the at least one of the plurality of resource devices to operate with the at least one second resource device to subsequently perform the workload such that the at least one SLA is satisfied includes:
configuring, by the resource management system, a third resource device in the plurality of resource devices such that the third resource device operates with the at least one second resource device to subsequently perform the workload such that the at least one SLA is satisfied.

17. The method of claim 14, wherein the DAG identifies software for utilization with the first resource device and the at least one second resource device to perform the workload, and wherein the configuration of the first resource device and the at least one second resource device to perform the workload based on the DAG includes configuration of the software for use with the first resource device and the at least one second resource device.

18. The method of claim 14, further comprising:
receiving, by the resource management system, first state information for the first resource device and second state information for the at least one second resource device during their performance of the workload; and
storing, by the resource management system, the first state information and the second state information in the at least one database, wherein the using portion of the DAG that is associated with the first resource device to configure the at least one of the plurality of resource devices to operate with the at least one second resource device includes configuring the at least one of the plurality of resource devices with the first state information stored for the first resource device.

19. The method of claim 18, wherein the first state information and the second state information are stored in the DAG.

20. The method of claim 14, wherein the storing the DAG in the at least one database includes storing initial state information for each of first resource device and the at least one second resource device for initially performing the workload.

* * * * *